United States Patent
Karafin et al.

(10) Patent No.: US 9,558,421 B2
(45) Date of Patent: Jan. 31, 2017

(54) IMAGE MASTERING SYSTEMS AND METHODS

(71) Applicant: RealD Inc., Beverly Hills, CA (US)

(72) Inventors: Jon Karafin, Lyons, CO (US); Mrityunjay Kumar, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 135 days.

(21) Appl. No.: 14/498,770

(22) Filed: Sep. 26, 2014

(65) Prior Publication Data

US 2015/0178585 A1 Jun. 25, 2015

Related U.S. Application Data

(60) Provisional application No. 61/887,160, filed on Oct. 4, 2013, provisional application No. 61/887,175, filed on Oct. 4, 2013.

(51) Int. Cl.

| | |
|---|---|
| *G06K 9/46* | (2006.01) |
| *H04N 5/76* | (2006.01) |
| *H04N 5/911* | (2006.01) |
| *G06T 3/00* | (2006.01) |
| *G06T 3/40* | (2006.01) |
| *G06T 5/00* | (2006.01) |
| *G06T 5/50* | (2006.01) |

(52) U.S. Cl.
CPC .......... *G06K 9/4609* (2013.01); *G06T 3/0087* (2013.01); *G06T 3/4038* (2013.01); *G06T 5/002* (2013.01); *G06T 5/50* (2013.01); *H04N 5/76* (2013.01); *H04N 5/911* (2013.01); *G06T 2207/10016* (2013.01); *G06T 2207/20076* (2013.01); *G06T 2207/20182* (2013.01)

(58) Field of Classification Search
None
See application file for complete search history.

(56) References Cited

U.S. PATENT DOCUMENTS

| | | |
|---|---|---|
| 6,665,448 B1 | 12/2003 | Maurer |
| 6,731,818 B1 * | 5/2004 | Conklin ............... H04N 19/503 375/E7.25 |
| 7,403,568 B2 | 7/2008 | Dumitras et al. |
| 7,587,099 B2 | 9/2009 | Szeliski et al. |

(Continued)

FOREIGN PATENT DOCUMENTS

| | | |
|---|---|---|
| EP | 1549054 A2 | 6/2005 |
| EP | 2053844 A1 | 4/2009 |

(Continued)

OTHER PUBLICATIONS

International Preliminary Report on Patentability for International Application No. PCT/US2014/057860 dated Apr. 5, 2016.

(Continued)

*Primary Examiner* — Stephen R Koziol
*Assistant Examiner* — Delomia L Gilliard
(74) *Attorney, Agent, or Firm* — Penny L. Lowry; Neil G. Mothew

(57) ABSTRACT

Systems, devices, and methods disclosed herein may apply a computational spatial-temporal analysis to assess pixels between temporal and/or perspective view imagery to determine imaging details that may be used to generate image data with increased signal-to-noise ratio.

17 Claims, 20 Drawing Sheets

(56) References Cited

U.S. PATENT DOCUMENTS

| | | | |
|---|---|---|---|
| 7,657,113 B2 | 2/2010 | Wong et al. | |
| 2005/0100095 A1* | 5/2005 | Itoh | G06T 7/202 375/240.16 |
| 2007/0140347 A1* | 6/2007 | Moon | G06T 3/4007 375/240.16 |
| 2009/0161982 A1* | 6/2009 | Tico | G06T 5/001 382/275 |
| 2011/0130669 A1* | 6/2011 | Garner | A61B 5/04012 600/509 |
| 2013/0177085 A1 | 7/2013 | Zhang et al. | |
| 2014/0354835 A1* | 12/2014 | Pakin | G06T 7/20 348/208.6 |

FOREIGN PATENT DOCUMENTS

| | | | |
|---|---|---|---|
| JP | 2012227791 A | 11/2012 | |
| JP | 2013078460 A | 5/2013 | |

OTHER PUBLICATIONS

International Search Report for International Application No. PCT/US2014/057860 dated Jan. 5, 2015.
Written Opinion of the ISA for International Application No. PCT/US2014/057860 dated Jan. 5, 2015.

\* cited by examiner

| Image regions | Visual Characteristic | Variance | Signal-to-Noise Ratio | Objective Computational Modification | Effects |
|---|---|---|---|---|---|
| RHVR | Noise Rich | High | Low | Increase SNR | Reduce Noise |
| RHVR | Detail Rich | High | Low | Decrease SNR | Further Improve Detail |
| RLVR | Low Noise | Low | High | Increase SNR | Further Reduce Noise |
| RLVR | Lost Detail | Low | High | Decrease SNR | Recover Detail |

*FIG. 17*

IMAGE MASTERING SYSTEMS AND METHODS

TECHNICAL FIELD

The present disclosure generally relates to imaging systems and processes, and more specifically, to systems and processes operable to generate single or multi-perspective image data.

BACKGROUND

Images, whether captured on a film or digitally, may have inherent noise artifacts because the film or sensor that capture the images may, for an amount of light, have certain limitations in its sensitivity, which will lead to noise in its signal. Other sources of artifacts may include post capture processing, including resizing, color grading, warping, compression, multiplexing, or any other manipulation to that image. Additionally, the capture system may have an inherent resolution limitation in terms of the resulting contrast in the captured data, due to a diffraction limitation of the capture system components, such as the lens, sensors, or any other optical components. The contrast in the capture data may be characterized in terms of the resulting line pairs per millimeter in the captured data.

SUMMARY

An exemplary image processing system of the present disclosure may include an interface configured to receive an image having first and second relatively high variance regions (RHVRs) and first and second relatively low variance regions (RLVRs) and a processor configured to generate an image having objective computational modifications. In an embodiment, the objective computational modifications may include any combinations of the following: 1) an increase of a signal-to-noise ratio ($\mu_{1st\ RHVR}/\sigma_{1st\ RHVR}$) of the first RHVR where $\mu_{1st\ RHVR}$ is the average pixel value of the first RHVR and $\sigma_{1st\ RHVR}$ is the standard deviation of the pixel values of the first RHVR; 2) a decrease of a signal-to-noise ratio ($\mu_{2nd\ RHVR}/\sigma_{2nd\ RHVR}$) of the second RHVR where $\mu_{2nd\ RHVR}$ is the average pixel value of the second RHVR and $\sigma_{1st\ RHVR}$ is the standard deviation of the pixel values of the second RHVR; 3) an increase of a signal-to-noise ratio ($\mu_{1st\ RLVR}/\sigma_{1st\ RLVR}$) of the first RLVR where $\mu_{1st\ RLVR}$ is the average pixel value of the first RLVR and $\sigma_{1st\ RLVR}$ is the standard deviation of the pixel values of the first RLVR; and 4) a decrease of a signal-to-noise ratio ($\mu_{2nd\ RLVR}/\sigma_{2nd\ RLVR}$) of the second RLVR where $\mu_{2nd\ RLVR}$ is the average pixel value of the second RLVR and $\sigma_{2nd\ RLVR}$ is the standard deviation of the pixel values of the second RLVR. In an embodiment, the objective computational modifications are based on a spatial-temporal analysis of pixels between a plurality of temporal frames and perspective views.

An exemplary embodiment of a method of construction an frame includes receiving a plurality of frames having a first line pair frequency and a first signal to noise ratio and generating at least one generated frame based on image data in the plurality of frames. The at least one generated frame has a second line pair frequency and a second signal to noise ratio. The second signal to noise ratio may be greater the first signal to noise ratio, and the second line pair may be at least 90% of the first line pair frequency. In an embodiment, the second line pair frequency may be at least 95% of the first line pair frequency. In another embodiment, the second line pair frequency may be greater than the first line pair frequency.

An exemplary embodiment of a method for constructing an image may include receiving a plurality of frames and generating at least one generated frame. Generating may include: a) determining, for M being Y and N being X, in which X and Y each are a number greater than zero, an Nth vector for an Mth frame of the plurality of frames, the Nth vector correlating the Mth frame to an Nth comparison frame of the plurality of frames that is not the Mth frame; b) creating an Nth generated frame of the Mth frame based on the Nth comparison frame different from the Mth frame and the Nth vector for the Mth frame; c) comparing pixels of the Nth generated frame of the Mth frame to pixels of the Mth frame; d) identifying low-confidence pixels of the Nth generated frame of the Mth frame, wherein a relative difference between the low-confidence pixels and corresponding pixels of the Mth frame is greater than a threshold; and e) replacing the low-confidence pixels of the Nth generated frame with pixels determined based upon the pixels of the Mth frame.

BRIEF DESCRIPTION OF THE DRAWINGS

Embodiments are illustrated by way of example in the accompanying figures, in which like reference numbers indicate similar parts, and in which:

FIG. 17 is a chart comparing the objective computational modifications that may be effected by the processor of FIG. 16, in accordance with the present disclosure.

DETAILED DESCRIPTION

Technical capture limitations may result from components within the capture system that may include the lens/optics, sensor, film stock, chemistry, electronics, filters, image processing, atmospherics, illumination, exposure, shutters, content medium age, data degradation or loss, etc. The capture limitations may manifest in various ways. For example, in an embodiment, a capture limitation may be characterized by an overall image resolution capability defined by a measurable signal-to-noise ratio ("SNR") and/or line pair frequency measurable in line pairs per millimeter (lp/mm). In this respect, some embodiments of the present disclosure may comprise systems, devices, and methods of applying a computational spatial-temporal analysis to assess pixels between temporal and/or perspective view imagery to determine imaging details that may be used to generate image data with increased SNR and/or line pair frequency.

In another embodiment, a capture limitation may be characterized by a measurable amount of resulting noise. While some intentional noise structure or grain may be a desirable image aesthetic, unintended or incoherent noise artifacts or structure may be technically undesirable. Some embodiments of the present disclosure may allow for a reduction in the undesirable noise artifacts. Such unintended or incoherent noise artifacts also reduce useful pixel information that could otherwise be captured in a frame, thereby preventing the frame to maximize its resolution and reducing the overall image efficiency. Accordingly, a reduction in the undesirable noise artifacts may allow some of the resolution that was taken up by the undesirable noise artifacts to be reclaimed.

Some embodiments of the present disclosure may comprise systems, devices, and methods of applying a computational spatial-temporal analysis to assess pixels between temporal and/or perspective view imagery to determine imaging detail occluded by noise artifact. In addition, the application of a spatial-temporal analysis may allow for increased temporal consistency, increased correlation between perspective images, and increased efficiency of compression algorithms.

Some embodiments of the present disclosure may compensate and correct for artifacts commonly associated with digital- or film-based capture through a unique spatial-temporal content analysis. The resulting images may provide increased signal to noise ratios, comfort, immersion, and overall image quality, without the use of traditional sharpening or denoising algorithms, which either sacrifices pixel information or degrades the image. Some embodiments of the present disclosure, which may be fully automated or semi-automated 2D and 3D mastering process, allow for improved results. Some embodiments may be adapted for advanced artist-driven control for the most discerning professionals on a per sequence or shot basis, allowing creatives to achieve further refined imaging results.

Figure 1:
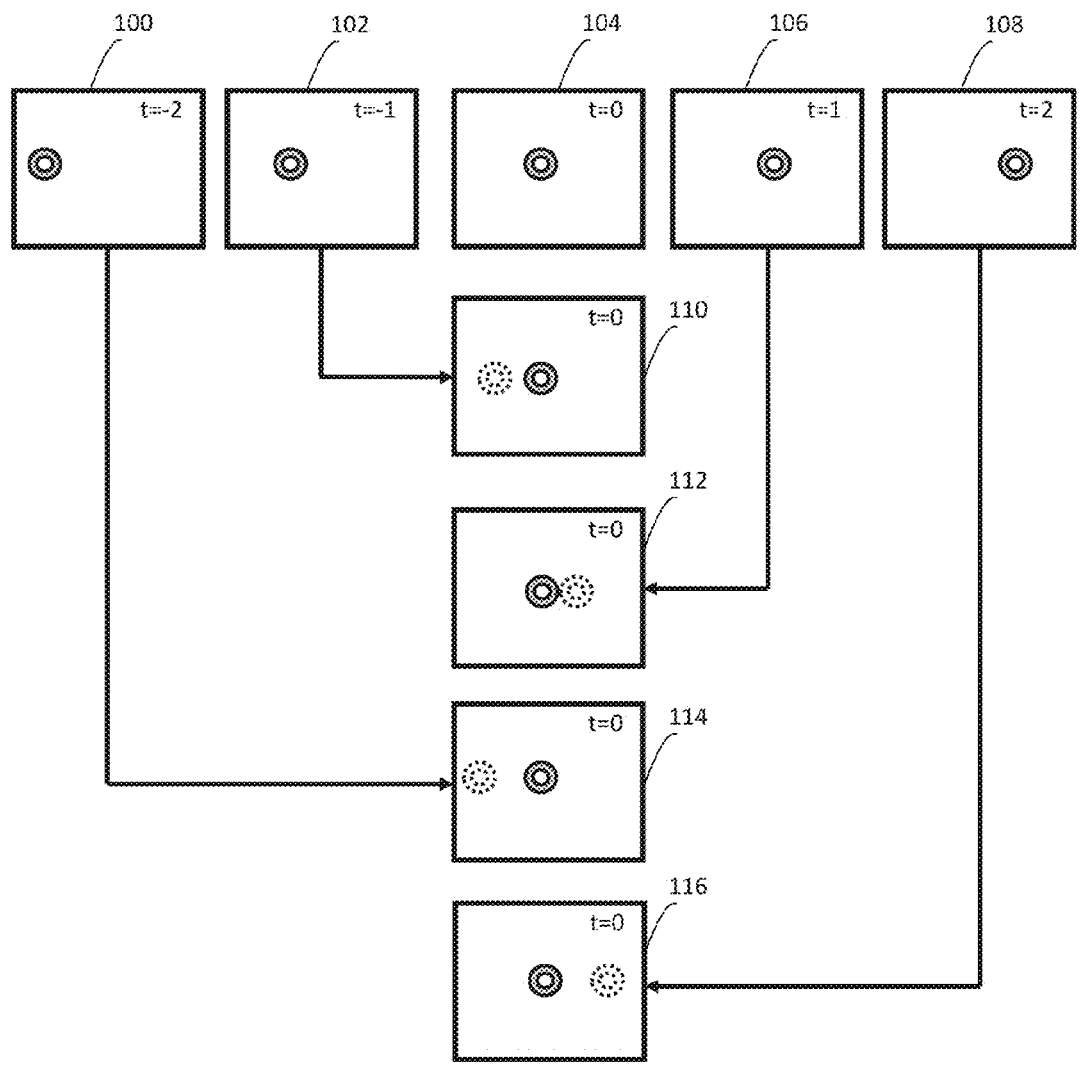
FIG. 1 is a schematic diagram illustrating an exemplary vector analysis of temporal frames, in accordance with the present disclosure.

FIG. 1 is a schematic diagram illustrating a plurality of frames 100, 102, 104, 106, 108. The frames 100, 102, 104, 106, 108 may include image data that define complete or partial images in any form that an image may be represented, including pixel values, vectors, etc. Alhtough only frames 100, 102, 104, 106, 108 are shown in FIG. 1, it is to be appreciated that an embodiment of the present disclosure may include any number of frames that may be used for the analysis disclosed herein, including, two, three, four, five, six, seven, eight, nine, ten, 100, 1000, or any other large numbers. The frames 100, 102, 104, 106, 108 may be a subset to a larger set of image frames. In the embodiment of FIG. 1, frames 100, 102, 104, 106, 108 may be in a sequential order such that frame 100 is a frame at time being zero, frames 102 and 104 are preceding frames at time being −2 and −1, respectively, and frames 106 and 108 are later frames at time being 1 and 2, respectively. It is to be appreciated that while frames 100, 102, 104, 106, 108 may be in a certain sequential order, some or all of the frames 100, 102, 104, 106, 108 may or may not be immediate consecutive frames.

For each of an M number of the t=−2, −1, 0, 1, or 2 frame, N number of frame may be generated based on the image data in the all or some of the frames 100, 102, 104, 106, 108. M is a number equal to Y, which is any number greater than 0, and N is a number equal to X, which is any number greater than 0. In an embodiment, X may be 1 or greater, and at least one generated frame may be constructed for each of the M number of the t=−2, −1, 0, 1, or 2 frame. In an embodiment, X may be greater than 1, and at least two generated frames may be constructed for each of the M number of the t=−2, −1, 0, 1, or 2 frame. In an embodiment, Y may be 1 or greater, and the image data in some or all of the frames 100, 102, 104, 106, 108 may be used to generate N number of frames for at least one of the t=−2, −1, 0, 1, or 2 frame in accordance to the principles of the present disclosure. In an embodiment, Y may be any number greater than 1, and the image data in some or all of the frames 100, 102, 104, 106, 108 may be used to generate N number of frames for at least two of the t=−2, −1, 0, 1, or 2 frame in accordance to the principles of the present disclosure. In an embodiment, Y may be any number greater than 2, and the image data in some or all of the frames 100, 102, 104, 106, 108 may be used to generate N number of frames for at least three of the t=−2, −1, 0, 1, or 2 frame in accordance to the principles of the present disclosure. N number of frames may be generated for any of the t=−2, −1, 0, 1, or 2 frame. For example, the image data in some or all of the frames 100, 102, 104, 106, 108 may be used to generate new t=−2 and t=1. In yet another example, the image data in some or all of the frames 100, 102, 104, 106, 108 may be used to generate t=−2, −1, 0, 1, and 2 frames in accordance to the principles of the present disclosure. It is to be appreciated that these examples are provided to illustrate the N number of frames may be generated for various combinations of t=−2, −1, 0, 1, or 2 frames.

In the exemplary embodiment shown in FIG. 1, X is 4, but it may be any other number in another embodiment. Since X is 4, 4 generated frames 110, 112, 114, and 116 are generated. In the exemplary embodiment shown in FIG. 1, Y is 1, but it may be any other number in another embodiment. Since Y is 1, the frames 110, 112, 114, and 116 are generated for one of the t=−2, −1, 0, 1, or 2 frame, and in the illustrated embodiment, the frames 110, 112, 114, and 116 are generated for the t=0 frame.

Figure 2:
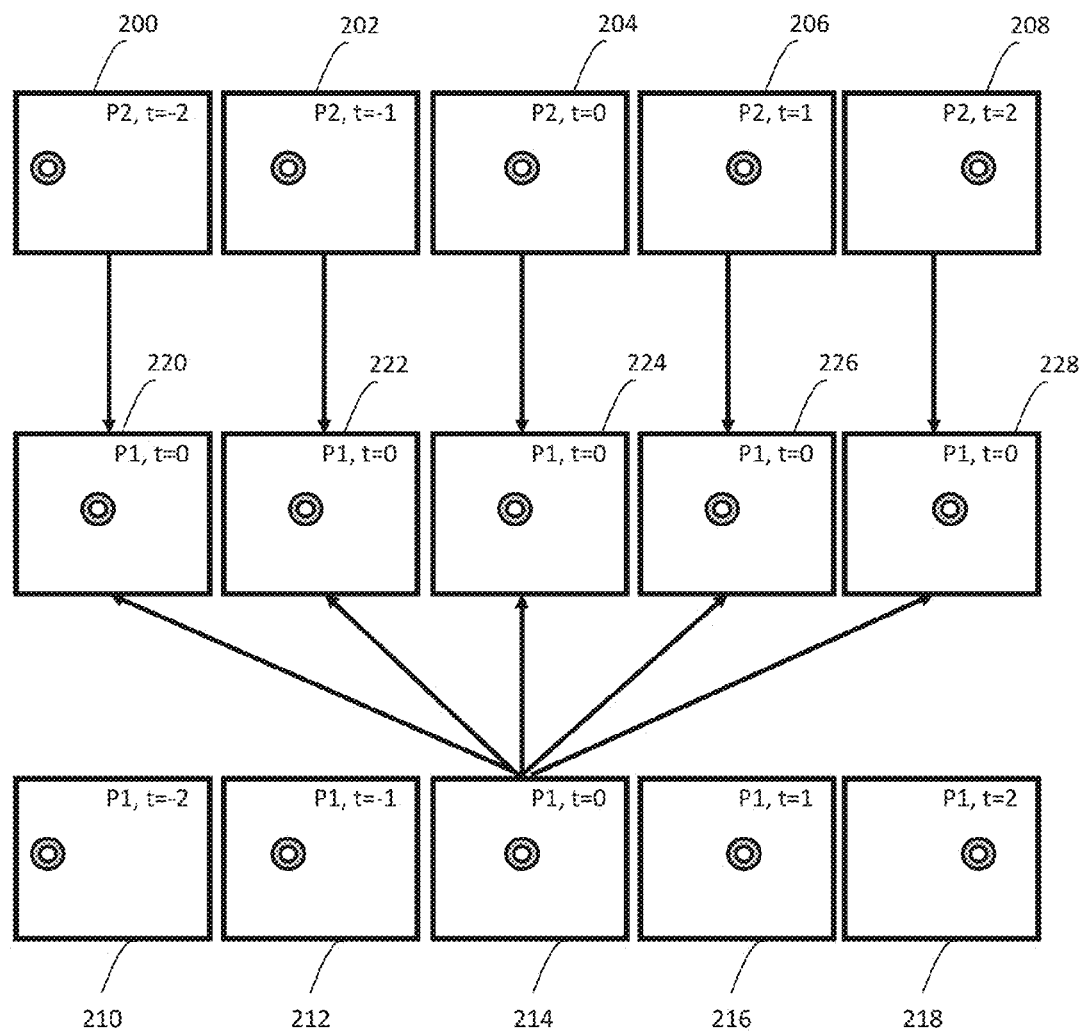
FIG. 2 is a schematic diagram illustrating an exemplary vector analysis of perspective frames, in accordance with the present disclosure.

FIG. 2 is a schematic diagram illustrating a plurality of frames 200, 202, 204, 206, 208, and 210. The frames 200, 202, 204, 206, 208, 210, 212, 214, 216, and 218 may include image data that define complete or partial images in any form that an image may be respresented, including pixel imformation, vectors, etc. The frames 200, 202, 204, 206, 208, 210, 212, 214, 216, and 218 may be a subset to a larger set of frames. In the embodiment of FIG. 2, frames 200, 202, 204, 206, 208, 210, 212, 214, 216, and 218 may include frames from different perspectives and in a sequential order.

In the embodiment of FIG. 2, frames 204 and 214 are first and second perspective frames at time being zero, frames 200 and 202 are preceding second perspective frames at time being −2 and −1, respectively, frames 210 and 212 are preceding first perspective frames at time being −2 and −1, respectively, frames 206 and 208 are later second perspective frames at time being 1 and 2, respectively, and frames 216 and 218 are later first perspective frames at time being 1 and 2, respectively. The frames 200 and 206 are first and second perspectives of the t=0 frame, respectively. It is to be appreciated that while frames 200, 202, 204, 206, 208, and 210 may be in a certain sequential order, some or all of the frames 200, 202, 204, 206, 208, 210, 212, 214, 216, and 218 may or may not be immediate consecutive frames. It is also to be appreciated that while only first and second perspective frames 200 and 206 are illustrated, other combinations of sequential-perspective frames may be used, including frames for more than two perspectives. In an embodiment, the frames 200, 202, 204, 206, 208, 210, 212, 214, 216, and 218 may all contain image data for different perspectives of the same moment in time and thus not in any sequential order.

For each of an M number of the t=−2, −1, 0, 1, or 2 frame for either perspective, N number of frame may be generated based on the image data in the all or some of the frames 200, 202, 204, 206, 208, 210, 212, 214, 216, and 218. M is a number equal to Y, which is any number greater than 0, and N is a number equal to X, which is any number greater than 0. In an embodiment, X may be 1 or greater, and at least one generated frame may be constructed for each of the M number of the t=−2, −1, 0, 1, or 2 frame for either perspective. In an embodiment, X may be greater than 1, and at least two generated frame may be constructed for each of the M number of the t=−2, −1, 0, 1, or 2 frame for either perspective. In an embodiment, Y may be 1 or greater, and the image data in some or all of the frames 200, 202, 204, 206, 208, 210, 212, 214, 216, and 218 may be used to generate N number of frames for at least one of the t=−2, −1, 0, 1, or 2 frame for either perspective in accordance to the principles of the present disclosure. In an embodiment, Y may be any number greater than 1, and the image data in some or all of the frames 200, 202, 204, 206, 208, 210, 212, 214, 216, and 218 may be used to generate N number of frames for at least two of the t=−2, −1, 0, 1, or 2 frame for either perspective in accordance to the principles of the present disclosure. In an embodiment, Y may be any number greater than 2, and the image data in some or all of the frames 200, 202, 204, 206, 208, 210, 212, 214, 216, and 218 may be used to generate N number of frames for at least three of the t=−2, −1, 0, 1, or 2 frame for either perspective in accordance to the principles of the present disclosure. N number of frames may be generated for any of the t=−2, −1, 0, 1, or 2 frame for either perspective. For example, the image data in some or all of the frames 200, 202, 204, 206, 208, 210, 212, 214, 216, and 218 may be used to generate new t=−2 and t=1 frames for the first perspective. In yet another example, the image data in some or all of the frames 200, 202, 204, 206, 208, 210, 212, 214, 216, and 218 may be used to generate t=−2, −1, 0, 1, and 2 frames for the second perspective in accordance to the principles of the present disclosure. It is to be appreciated that these examples are provided to illustrate the N number of frames may be generated for various combinations of t=−2, −1, 0, 1, or 2 frames for either perspective.

In the exemplary embodiment shown in FIG. 2, X is 5, but it may be any other number in another embodiment. Since X is 5, 5 generated frames 220, 222, 224, 226, and 228 are generated. In the exemplary embodiment shown in FIG. 1, Y is 1, but it may be any other number in another embodiment. Since Y is 1, the frames 220, 222, 224, 226, and 228 are generated for one of the t=−2, −1, 0, 1, or 2 frame for either perspective, and in the illustrated embodiment, the frames 220, 222, 224, 226, and 228 are generated for the t=0 frame for the first perspective.

Figures 3, 4:
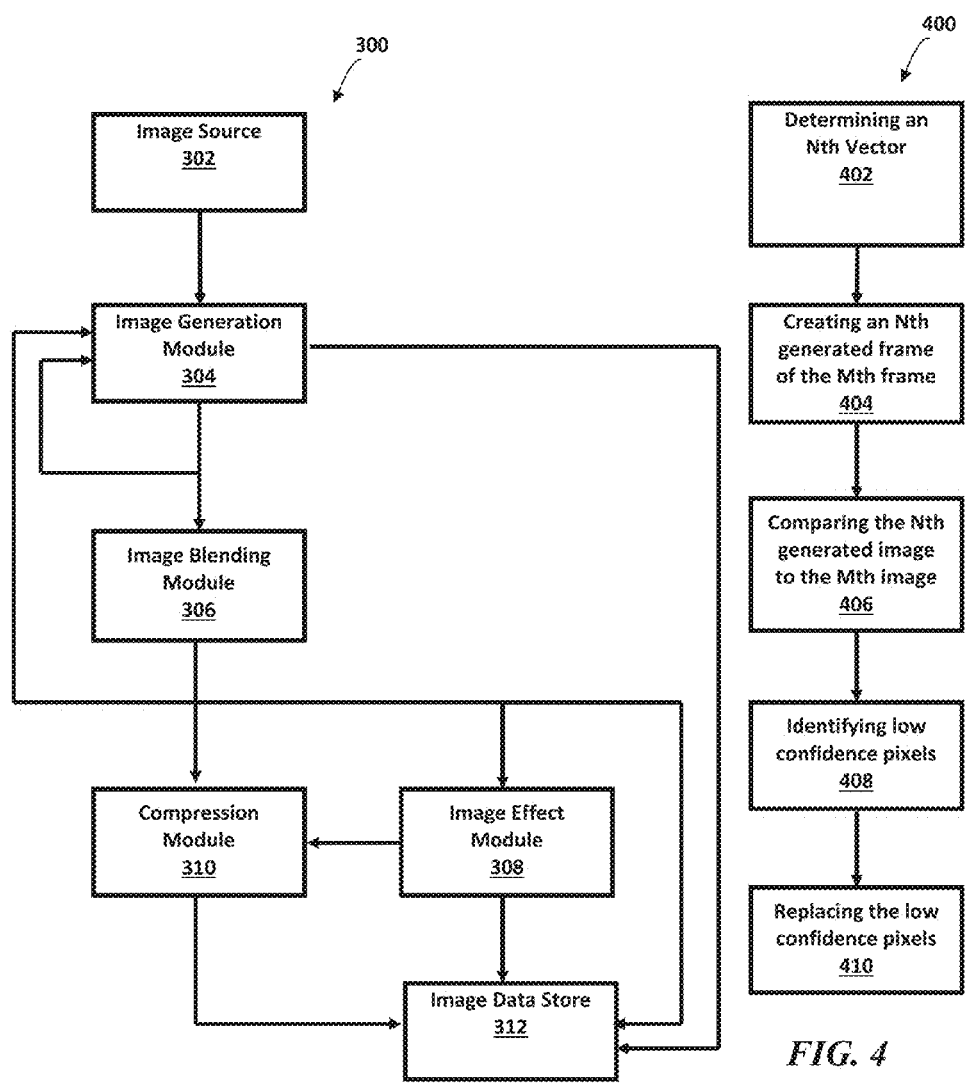
FIG. 3 is a schematic diagram illustrating an exemplary image processing system, in accordance with the present disclosure.
FIG. 4 is a flow diagram illustrating an exemplary bodiment of a process for constructing an image, in accordance with the present disclosure.

FIG. 3 is a schematic diagram of an image processing system 300. The image processing system may be incorporated in any device suitable for processing image data, including desktop computers, laptops, tablets, smart phones, image capture devices, home and cinema media receivers or processors, such as televisions, set-up boxes, image projection systems, DCP servers or any combination of thereof.

In an embodiment, the image processing system 300 may include an image source 302 for operable to provide image data. In an embodiment, the image source 302 may comprise a capture device operable to provide image data from a sensor of the capture device. In an embodiment, the capture device may be operable to store image data in a temporary memory, such a random-access memory (RAM) and provide image data from the RAM.

In an embodiment, the image source 302 may include a memory device incorporated or separate from a capture device. For example, the image source 302 may include a memory device, a disc, tape, hard drive, flash drive, film, or any other media that may be operable to store images or image data. In an embodiment, the image source 302 may include a disc or memory device connected locally or remotely to the sensor of one or more capture device. In an embodiment, the capture device may be operable to captured image data, which may be stored in an imaging source 302 comprising a disc or a local memory. The captured image data may be transmitted to a remote memory from the disc or the local memory in real time or in a time-delayed or offline fashion. In another embodiment, the capture device may also transmits the captured image data to an imaging source 302 comprising a remote memory in real time or in a time-delayed or offline fashion without being first stored in a disc or local memory. The image source 302 may be located in one or more locations or in the Cloud.

In an embodiment, the image source 302 may be operable to provide computer generated image data (CG image data) not captured by a capture device. The image source 302 may be operable to receive the CG image data from a CG engine via tape or disc, or via local or remote electronic communication. The CG engine may include a game engine, simulation engine, a render engine, a virtual engine, or any other known processor or engine for generating digital image data in 2D or 3D space. The image source 302 may be operable to provide the CG image data in real time or in a time-delayed or offline fashion.

The image processing system 300 may include an image generation module 304 communicatively connected to the image source 304. The image generation module 304 may include at least one processor, which may include any combination of a computer, a microprocessor, a programmed machine, a server, or any other hardware operable to be configured to implement the processes of the present disclosure. The image generation module 304 may be accessible and communicatively connected over a wide area network (WAN), local area network (LAN), optic fiber, cable channel, satellite network, cellular network, radio network, infrared link, the Cloud, the Internet, or any other wired or wireless communication connection known in the art. The image generation module 304 may be located in one or more locations or in the Cloud.

In an embodiment, the image generation module 304 is operable to receive image data and generate at least one image frame based on image data for a plurality of image frames. For examples, the image generation module 304 may be operable to receive, from the image source 203, frames 100, 102, 104, 106, 108 as discussed with respect to FIG. 1 or frames 200, 202, 204, 206, 208, 210, 212, 214, 216, and 218 as discussed with respect to FIG. 2. The image data may be received from the image source 302 via a disc or any wired or wireless communication network either locally or remotely, such as WAN, LAN, optic fiber, cable channel, satellite network, cellular network, radio network, infrared link, the Cloud, the Internet, or any media delivery or communication network. In an embodiment, the image generation module 304 may be operable to receive image data directly from a capture device without first being stored in an image source.

In an embodiment, the image generation module 304 is configured to generate N number of frame based some or all of the sequential, perspective, or sequential-perspective frames recevied. N may be a number equal to X, which may be any number greater than 0. For example, in the embodiment of FIG. 1, the image generation module 304 may be operable to generate frames 110, 112, 114, and 116 based on the image data in some or all of the frames 100, 102, 104, 106, or 108 as discussed above with respect to FIG. 1. In another example, in the embodiment of FIG. 2, the image generation module 304 is operable to generate frames 220, 222, 224, 226, and 228 based on the image data in some or all of the frames 200, 202, 204, 206, 208, 210, 212, 214, 216, and 218 as discussed above with respect to FIG. 1. The image generation module 304 may operate according to any processes disclosed herein to generate at least one image frame based on image data for a plurality of image frames.

FIG. 4 illustrates an exemplary embodiment of a process 400 that may be implemented by the image generation module 304 to generate at least one image frame based on image data for a plurality of image frames. In one approach, the generation of the at least one image frame may be based on a vector analysis of the image data. The process 400 may include a determining element 402, in which, for M being Y and N being X, an Nth vector is determined for an Mth frame of the plurality of image frames. X and Y are each a number greater than zero. The Mth frame of the plurality of image frames may be a sequential, perspective, or sequential-perspective frame. Referring to the embodiments discussed with respect to FIG. 1, the Mth frame may be any one of the sequential frames 100, 102, 104, 106, or 108, and in the illustrated embodiment, the Mth frame for M=Y is the t=0 frame 100 as shown in FIG. 1. Referring to the embodiments discussed with respect to FIG. 2, the Mth frame may be any one of the sequential-perspective frames 200, 202, 204, 206, 208, 210, 212, 214, 216, or 218, and in the illustrated embodiment, the Mth frame for M=Y is the first perspective, t=0 frame 214 as shown in FIG. 2.

The Nth vector may be a motion vector, a perspective vector, or a motion-perspective vector for correlating the Mth frame to an Nth comparison frame of the plurality of image frames that is not the Mth frame. In other words, the Nth vector may include coordinates for one or more pixel in the Mth that matches one or more pixel in the Nth frame. Referring to the embodiments discussed with respect to FIG. 1, the Nth comparison frame may be any one of the frames 102, 104, 106, or 108 that is not the Mth frame, and in the illustrated embodiment, the Nth comparison frame for N=X is the t=−1 frame 104 as shown in FIG. 1. Referring to the embodiments discussed with respect to FIG. 2, the Nth comparison frame may be any one of the frames 200, 202, 204, 206, 208, 210, 212, 216, or 218, and in the illustrated embodiment, the Nth comparison frame for N=X is the second perspective, t=−2 frame 104 as shown in FIG. 2.

Turning back to FIG. 4, after determining the Nth vector, the process 400 may include a creating element 404, in which an Nth generated frame of the Mth frame is created based on the Nth comparison frame different from the Mth frame and the Nth vector for the Mth frame. The coordinates of the Nth vector allow for a reconstruction of the Mth frame from the Nth comparison frame. Referring to the embodiments discussed with respect to FIG. 1, the Nth generated frame may be any one of the frames 110, 112, 114, or 116 generated for the t=0 frame, and in the illustrated embodiment, the Nth generated frame for N=X is the frame 112 as shown in FIG. 1. Referring to the embodiments discussed with respect to FIG. 2, the Nth generated frame may be any one of the frames 220, 222, 224, 226, and 228 generated for the t=0 frame for the first perspective, and in the illustrated embodiment, the Nth generated frame for N=X is the frame 220 as shown in FIG. 2.

In an embodiment, the process 400 may include a rejection analysis for the pixels of the Nth generated frame for the Mth frame. The Nth generated frame for the Mth frame may comprise pixels that deviates from the corresponding pixels of the Mth frame by a threshold amount and thus may be rejected for low confidence. In an embodiment, the process 400 may include a comparing element 406 in which pixels of the Nth generated frame of the Mth frame are compared to pixels of the Mth frame. The process 400 may also include an identifying element 408 in which low-confidence pixels of the Nth generated frame of the Mth frame are identified when a relative difference between the low-confidence pixels and corresponding pixels of the Mth frame is greater than a threshold. A relative difference may be understood as the absolute difference between a low-confidence pixel value and the corresponding pixel value divided by the corresponding pixel value in the Mth frame. In other words, the relative difference may be understood to be the value of $|PV_{NthGenerated} - PV_{Mth}|/PV_{Mth}$, in which $PV_{NthGenerated}$ is the low-confidence pixel value, and $PV_{Mth}$ is the corresponding pixel value in the Mth frame. In an embodiment, the threshold may be between 0 to 95%. In a preferred embodiment, the threshold may be between 0 to 75%. In a most preferred embodiment, the threshold may be between 0 to 50%. The comparing element 406 may be performed and the thresholds of the present disclosure may be applied in any color space or gamma range suitable for the embodiments herein. For example, the thresholds may be applied in logarithmic or linear space. It is to be appreciated that an additional threshold may be applied in combination of the threshold based on the relative difference of corresponding pixels. The additional thresholds may be based on various content analysis factors. For example, in an embodiment, the additional threshold may be based on a maximum value for the Nth vector. As such, unrelated contents, such as frames that embody a scene cut, would not contribute to the generation of generated frames in the process 400.

Rejecting pixels in the Nth generated frame would cause the Nth generated frame to appear to have dark pixels at the location of the rejected pixels. As such, the process 400 may include a replacing element 410, in which the low-confidence pixels of the Nth generated frame for the Mth frame may be replaced with pixels determined based upon the pixels of the Mth frame and/or pixels of the Nth generated frame not identified as low-confidence pixels. In an embodiment, the replacement pixels may be determined based upon the pixels of the Mth frame and pixels of the Nth generated frame. In an embodiment, the replacing element 410 may include blending selected pixels from the Mth frame to replace a low-confidence pixel. A low-confidence pixel may be replaced by the corresponding pixel in the Mth frame. In some embodiments, a low-confidence pixel may be replaced by an average of the corresponding pixel and the neighboring pixels in the Mth frame. It is to be appreciated that the averaging used herein may be any type of averaging known, including linear averaging and weighted averaged for various factors, such as proximity to the location of the low-confidence pixels. The blending of pixels discussed above may also include blending in pixels from the Nth generated frame that are near the low-confidence pixels.

Figure 5A:
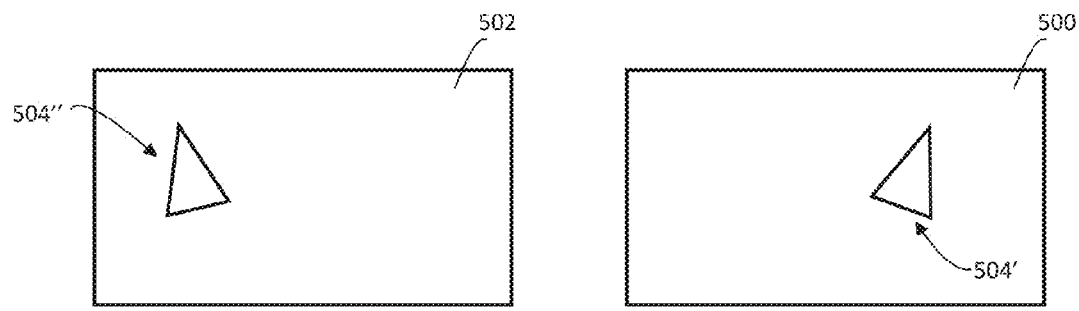
FIGS. 5a-5e are schematic diagrams illustrating an exemplary embodiment of a vector analysis and a rejection analysis of a plurality of image frames, in accordance with the present disclosure.

An exemplary illustration of the process 400 is provided with reference to FIGS. 5a-5e. FIG. 5a illustrates an Mth frame 500 and an Nth comparison frame 502. The Mth frame 500 and the Nth comparison frame 502 may include similar scene elements. A scene element 504' may be included in the Mth frames 500, and a scene element 504" may be included in the Nth comparison frame 502. The scene elements 504' and 504" may depict the same object, but the position and orientation of the scene elements 504' and 504" may be different in the frames 500 and 502. The difference in the position and orientation of the scene elements 504' and 504" may be intended to depict motion between the frames 500 and 502 and/or different perspectives if the Mth frame 500 and Nth comparison frame 502 are stereoscopic frames.

Figure 5B:
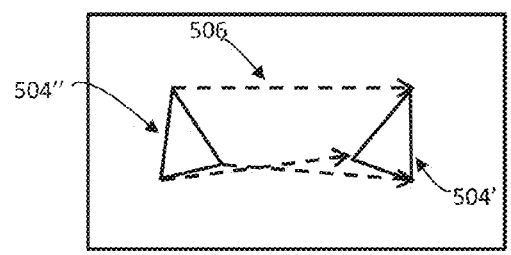

FIG. 5b is a schematic diagram illustrating an exemplary vector analysis for the scene elements 504' and 504" in FIG. 5a. In accordance with the determining element 402 of the process 400 of FIG. 4, the scene elements 504' and 504" in the frames 500 and 502 may be analyzed using a vector analysis to determine an Nth vector 506 correlating the Mth frame 500 to an Nth comparison frame 502. The Nth vector 506 may include the spatial coordinates where a pixel or a plurality of pixels for the scene element 504" in the Nth comparison frame 502 most closely matches the corresponding pixel or a plurality of pixels for the scene element 504' in the Mth frame 500.

Figure 5C:
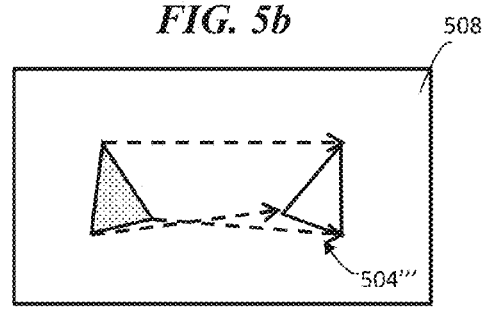

FIG. 5c is a schematic diagram illustrating the creating of an Nth generated frame 508 for the Mth frame 500 in accordance with the creating element 404 of the process 400 of FIG. 4. Using the coordinates of the Nth vector 506, the pixels of the scene element 504" in the Nth comparison frame 502 may be retargeted to the coordinates shown in FIG. 5c, thereby creating a scene element 504'" for the Nth generated frame 508.

Figure 5D:
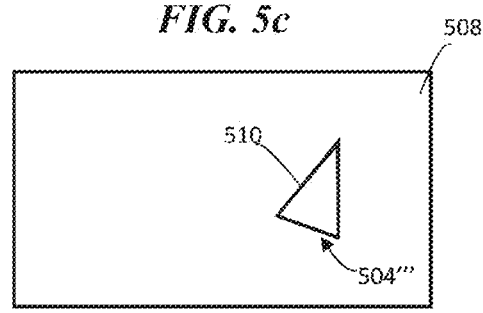

FIG. 5d is a schematic diagram illustrating an Nth generated frame 508 comprising low confidence pixels. After creating the Nth generated frame 508, a rejection analysis of the pixels of the Nth generated frame 508 may be used to identify and replace pixels that has a low confidence in accuracy. In accordance with the comparing element 406 of the process 400 of FIG. 4, the Nth generated frame 508 of FIG. 5c may be compared to the Mth frame 500 of FIG. 5a. In accordance with the identifying element 408 of the process 400 of FIG. 4, low-confidence pixels 510 of the Nth generated frame 508 for the Mth frame 500 may be identified and rejected. The low-confidence pixels 510 and corresponding pixels of the Mth frame 500 may have a relative difference greater than a threshold as discussed above. The rejection of low-confidence pixels would leave a void in the Nth generated frame 508 and have a dark appearance as illustrated in FIG. 5d. In an embodiment, the low-confidence pixels 510 may be found mostly near the edges of the scene element 504'". Nonetheless, the low-confidence pixels 510 may exist anywhere in the Nth generated frame 508.

Figure 5E:
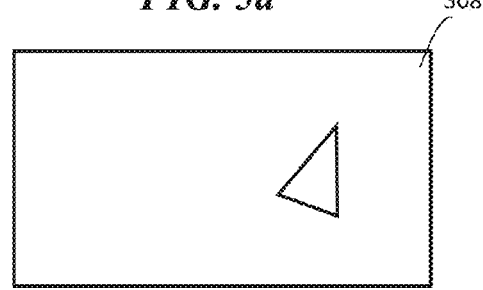

FIG. 5e is a schematic diagram illustrating an Nth generated frame 508 with replacement pixels in place of the low-confidence pixels 510 identified in FIG. 5d. The replacement pixels may be determined based upon the pixels of the Mth frame 500 in accordance with the replacing element 410 of the process 400 of FIG. 4.

Referring to FIGS. 5b to 5e, the Nth vector 506 may be determined by a subjective evaluation of the scene elements 504' and 504" in frames 500 and 502, respectively. In an embodiment, the Nth vector 506 is preferably determined objectively by applying objective criteria. The objective determination of the Nth vector 506 may be implemented using an algorithm. In an embodiment, the analysis of the pixels of the frames 500 and 502 and the determination of spatial coordinates of the Nth vector 506 may be performed statistically to identify matching pixels. The determination of spatial coordinates of the Nth vector 506 may be performed on a pixel-by-pixel basis or a block-by-block basis. Matching blocks of pixels for the scene element 504' to blocks of pixels for the scene element 504" allows for a higher matching accuracy because blocks of pixels provide multiple reference points to match and increases the probability of matching correctly. However, retargeting blocks of pixels from the scene element 504" to form the scene element 504'" in the Nth generated frame 508 means that any artifacts in the retargeted blocks of pixels would be carried over to the Nth generated frame 508. As such, the artifact reduction may not be maximized when blocks of pixels of the scene elements 504' and 504" are used to determine the Nth vector 506. On the other hand, matching individual pixels or small blocks (e.g., 2×1, 2×2) pixels of the scene element 504' to individual pixels or small blocks of pixels for the scene element 504" allows for a more detailed vector analysis and consequently more detailed artifact reduction. However, this approach may have a lower matching accuracy because single pixels do not have multiple reference points to increase the probability of matching correctly. For the same reason, matching smaller blocks of pixels may have a lower matching accuracy than matching larger blocks of pixels.

It is to be appreciated that any processes of the present disclosure, including the determination of a vector, the creation of a generated frame based on the vector, and the rejection analysis of the generated frame as described with respect to exemplary embodiments in FIGS. 4 and 5, may be carried out in part or in full in any color space. In an embodiment, the processes of the present disclosure may be performed in the linear RGB color space for image frames provided in RGB color space. The image frames such as the frames 500 and 502 may be provided in a non-linear RGB color space, and the frames 500 and 502 may be transformed to a linear RGB color space for further processing.

In an embodiment, image frames provided in any RGB color space may be transformed to a non-RGB color space such that some or all of the process elements of the present disclosure may be performed in the non-RGB color space. An example of a non-RGB space would be a DCI XYZ space. In an embodiment, image data may be provided initially in a linear RGB space. The image data may be translated to a XYZ space by applying a color matrix to the image data from the RGB space. Some or all of the vector analysis and rejection analysis discussed with respect to FIGS. 4 and 5 may be performed in the XYZ space. In an embodiment, the vector analysis of FIG. 5b and the retargeting of FIG. 5c may be performed in the XYZ space. It is to be appreciated that performing the vector analysis and the retargeting in XYZ space as opposed to the RGB space may allow more focus on a region of a frame that includes high and low frequency data, thereby improving the accuracy of the vector analysis and retargeting. It is also to be appreciated that the vector analysis of FIG. 5b and the retargeting of FIG. 5c may be performed in different color space to allow for further improved accuracy. In an embodiment, the vector analysis of FIG. 5b may be performed in a non-logarithmic XYZ space, and the Nth comparison frame 502 may be transformed from the non-logarithmic XYZ space to a logarithmic XYZ space to allow the retargeting of FIG. 5c to be performed in the logarithmic XYZ space. This approach may allow for various subpixel filtration retargeting algorithms without having the potential for unanticipated negative values in the resultant Nth generated frame 508 in FIG. 5c.

In an embodiment, if desired, a product of the processes of the present disclosure, such as an image frame generated and modified in a non-RGB space may be transformed back to a RGB color space. For example, The Nth generated frame 508 of FIG. 5c may be translated back to the RGB color space for the rejection analysis discussed with respect to FIGS. 5d and 5e. The replacement of the low-confidence pixels 510 illustrated in FIG. 5d with pixels blended between the Mth frame 500 and the Nth generated frame 508 may performed in the RGB color space such that the blended color value in the final Nth generated frame 508 in FIG. 5e may better reflect the intended color of the scene. Additionally, it may be desirable to perform the rejection analysis of FIG. 5d in a linear RGB color space, because the threshold for identifying low-confidence pixel may be applied linearly.

It is to be appreciated that, in another embodiment, the resultant frame after the determination of a vector, the creation of a generated frame based on the vector, or the rejection analysis of the generated frame as described with respect to exemplary embodiments in FIGS. 4 and 5 may be translated to the RGB color space for other reasons not disclosed herein.

Referring back to FIG. 4, at the completion of the determining element 402, creating element 404, comparing element 406, identifying element 408, and replacing element 410, one Nth generated frame for the Mth frame is generated for M=Y and N=X. It is to be appreciated that for X values being greater than one, the process 400 may be repeated to generate a plurality of Nth generated frames for the Mth frame (e.g., Nth generated frames for the Mth frame for N=X−1, X−2, . . . 1). It is to be appreciated that for Y values being greater than one, the process 400 may be repeated to generate one or more Nth generated frames for a plurality of the Mth frame (e.g., for Mth frames for M=Y−1, Y−2, . . . 1).

Figure 6A:
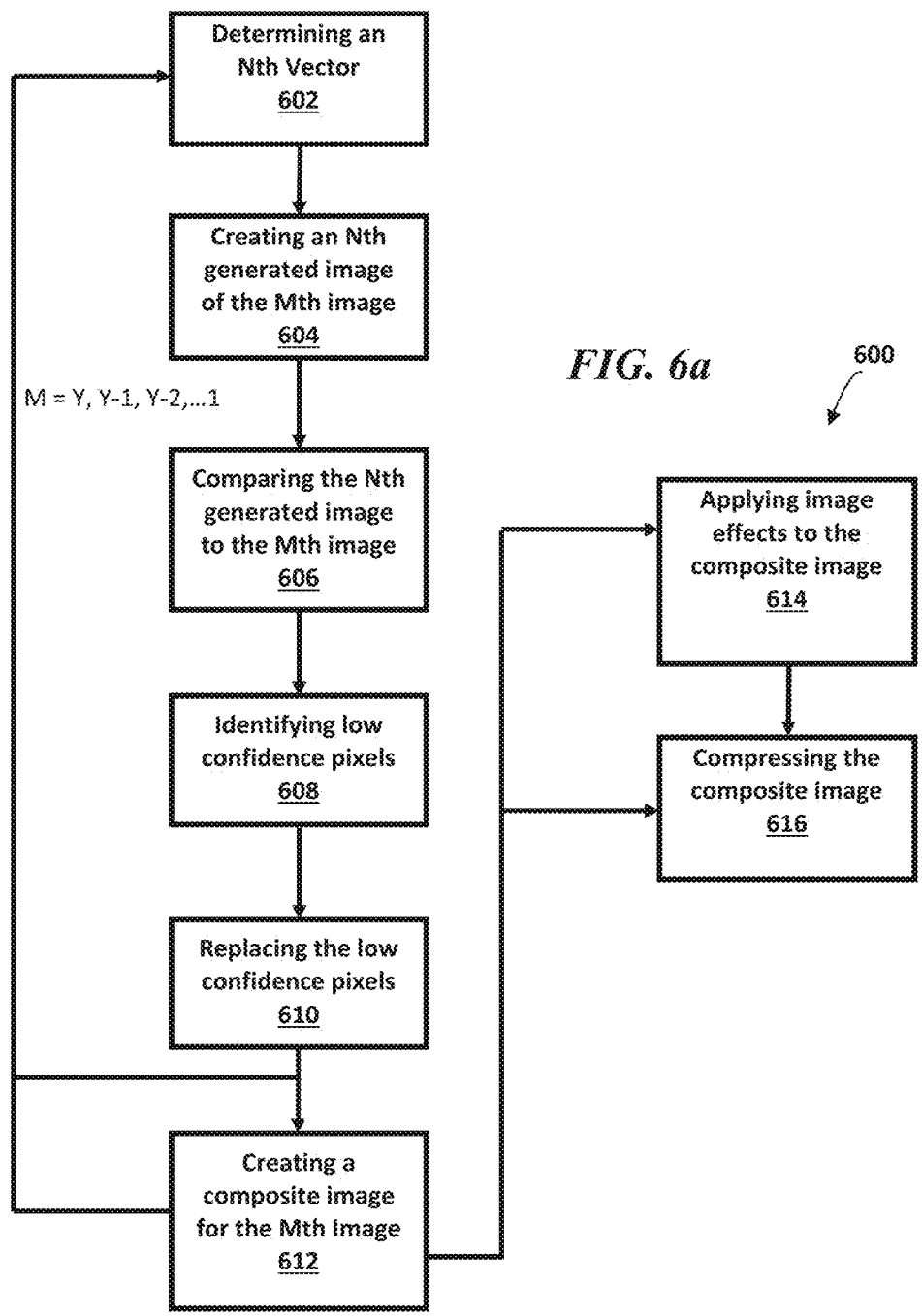
FIG. 6a is a flow diagram illustrating an exemplary bodiment of a process for constructing an image, in accordance with the present disclosure.

FIG. 6a is an exemplary embodiment of a process 600 that may be implemented by the image processing system 300 to generate at least one image frame based on image data for a plurality of image frames. The process 600 may include a determining element 602 that may be similar to the determining element 402 of process 400 discussed above. In the determining element 602, for M being Y and N being X, an Nth vector may be determined for an Mth frame of the plurality of image frames using any embodiments of the vector analyses described herein. X and Y are each a number greater than zero. The Mth frame of the plurality of image frames may be a sequential, perspective, or sequential-perspective. Referring to the embodiments discussed with respect to FIG. 1, the Mth frame for M being Y may be any one of the sequential frames 100, 102, 104, 106, or 108, and in the illustrated embodiment, the Mth frame for M=Y is the t=0 frame 100 as shown in FIG. 1. Referring to the embodiments discussed with respect to FIG. 2, the Mth frame may be any one of the sequential-perspective frames 200, 202, 204, 206, 208, 210, 212, 214, 216, or 218, and in the illustrated embodiment, the Mth frame for M=Y is the first perspective, t=0 frame 214 as shown in FIG. 2.

The Nth vector may be a motion vector, a perspective vector, or a motion-perspective vector for correlating the Mth frame to an Nth comparison frame of the plurality of image frames that is not the Mth frame. Referring to the embodiments discussed with respect to FIG. 1, the Nth comparison frame may be any one of the frames 102, 104, 106, or 108 that is not the Mth frame, and in the illustrated embodiment, the Nth comparison frame for N=X is the t=−1 frame 104 as shown in FIG. 1. Referring to the embodiments discussed with respect to FIG. 2, the Nth comparison frame may be any one of the frames 200, 202, 204, 206, 208, 210, 212, 216, or 218, and in the illustrated embodiment, the Nth comparison frame for N=X is the second perspective, t=−2 frame 104 as shown in FIG. 2.

Turning back to FIG. 6a, after determining the Nth vector, the process 600 may include a creating element 604 that may be similar to the creating element 404 of the process 400 as discussed above. In the creating element 604, an Nth generated frame of the Mth frame is created based on the Nth comparison frame different from the Mth frame and the Nth vector for the Mth frame. Referring to the embodiments discussed with respect to FIG. 1, the Nth generated frame may be any one of the frames 110, 112, 114, or 116 generated for the t=0 frame, and in the illustrated embodiment, the Nth generated frame for N=X is the frame 112 as shown in FIG. 1. Referring to the embodiments discussed with respect to FIG. 2, the Nth generated frame may be any one of the frames 220, 222, 224, 226, and 228 generated for the t=0 frame for the first perspective, and in the illustrated embodiment, the Nth generated frame for N=X is the frame 220 as shown in FIG. 2.

The process 600 may include a rejection analysis for the pixels of the Nth generated frame for the Mth frame. In an embodiment, the process 600 may include a comparing element 606 in which pixels of the Nth generated frame of the Mth frame are compared to pixels of the Mth frame. The process 600 may also include an identifying element 608 in which low-confidence pixels of the Nth generated frame of the Mth frame are identified when a relative difference between the low-confidence pixels and corresponding pixels of the Mth frame is greater than a threshold. The comparing element 606 and the identifying element 608 may be similar to the comparing element 406 and the identifying element 408 of the process 400 discussed above, respectively.

The process 600 may include a replacing element 610 that may be similar to the replacing element 410 of process 400. In the replacing element 610, the low-confidence pixels of the Nth generated frame for the Mth frame may be replaced with pixels determined based upon the pixels of the Mth frame and/or pixels of the Nth generated frame not identified as low-confidence pixels. In an embodiment, the replacing element 610 may include averaging selected pixels from the Mth frame and/or pixels of the Nth generated frame not identified as low-confidence pixels to replace a low-confidence pixel. For each low-confidence pixel, the corresponding pixel and, in some embodiments, the neighboring pixels in the Mth frame may be selected for averaging. It is to be appreciated that the averaging used herein may be any type of average known, including linear averaging, and weighted averaged for various factors, such as proximity to the location of the low-confidence pixels.

At the completion of the determining element 602, creating element 604, comparing element 606, identifying element 608, and replacing element 610, which may be performed by the image processing module 304, an Nth generated frame for the Mth frame is generated for M=Y and N=X. In an embodiment, Y may be greater than one, and the process 600 may comprise repeating the determining element 602, creating element 604, comparing element 606, identifying element 608, and replacing element 610 to generate an Nth generated frame of the Mth frame for M=Y-1, thereby creating generated images for at least two frames of the plurality of frames. In an embodiment, Y may be greater than two, and the process 600 may comprise repeating the determining element 602, creating element 604, comparing element 606, identifying element 608, and replacing element 610 to generate an Nth generated frame of the Mth frame for M=Y-1, Y-2, ..., 1.

Figure 6B:
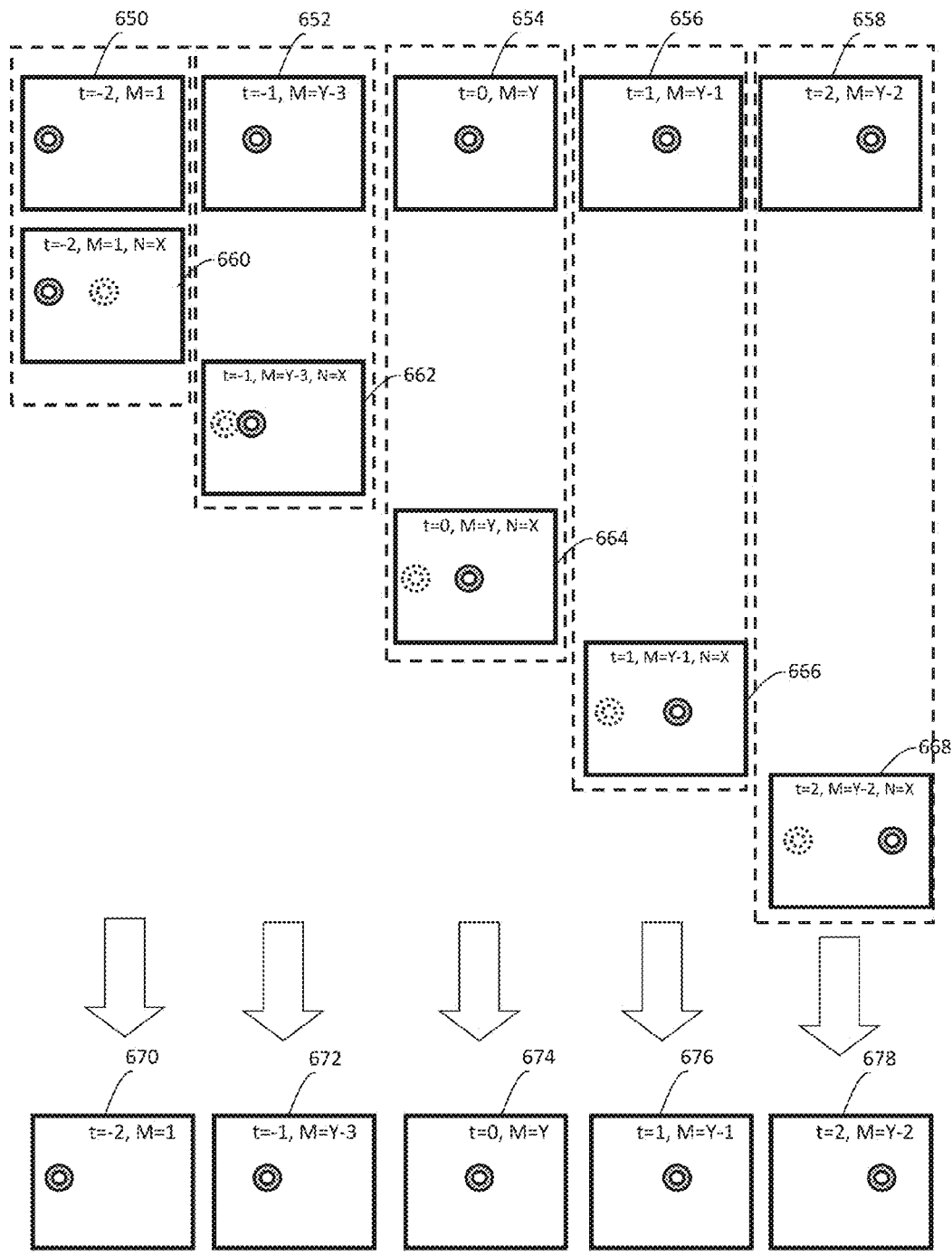
FIG. 6b is a schematic diagram demonstrating an exemplary operation of the process in FIG. 6a, in accordance with the present disclosure.

FIG. 6b is a schematic diagram illustrating the generation of an Nth generated frame of the Mth frame for M=Y-1, Y-2, ..., 1 based on image data for a plurality of frames 650, 652, 654, 656, and 658. In an embodiment, the plurality of frames of frames 650, 652, 654, 656, and 658 may comprise temporal frames similar to the frames 100, 102, 104, 106, and 108 of FIG. 1. The plurality of frames 650, 652, 654, 656, and 658 may be in a sequential order such that frame 654 is a frame at time being zero, frames 650 and 652 are preceding frames at time being -2 and -1, respectively, and frames 656 and 658 are later frames at time being 1 and 2, respectively. It is to be appreciated that while frames 650, 652, 654, 656, and 658 may be in a certain sequential order, some or all of the frames 650, 652, 654, 656, and 658 may or may not be immediate consecutive frames. Although not illustrated in FIG. 6b, it is to be appreciated that in an embodiment, some or all of the frames 650, 652, 654, 656, and 658 may comprise perspective frames similar to those illustrated in FIG. 2.

The determining element 602 of the process 600 may be performed to determine an Nth vector for an Mth frame, which may be any one of the frames 650, 652, 654, 656, or 658, and in the illustrated embodiment, the Mth frame for M=Y is the t=0 frame 654 as shown in FIG. 6b. In the illustrated embodiment, the Nth comparison for the Mth frame 654 is the frame 650, but in another embodiment, Nth comparison frame for N=X may be any one of the frames 650, 652, 656, or 658 that is not the Mth frame 654 for M=Y. The creating element 604, comparing element 606, identifying element 608, and replacing element 610 of the process 600 may be performed to generate an Nth generated frame 664 for the Mth frame 654 for M=Y and N=X. The process 600 may be repeated to determine an Nth vector for an Mth frame 656 and generate an Nth generated frame 666 for M=Y-1 and N=X. The process 600 may be repeated to determine an Nth vector for an Mth frame 658 and generate an Nth generated frame 668 for M=Y-2 and N=X. The frame 650 may be used as the Nth comparison to determine the Nth vector for the Mth frame 658 as illustrated. The frames 652, 654, and 656 may also be used as the Nth comparison frame. The process 600 may be repeated to determine an Nth vector for an Mth frame 652 and generate an Nth generated frame 662 for M=Y-1 and N=X. The frame 650 may be used as the Nth comparison to determine the Nth vector for the Mth frame 652 as illustrated. The frames 654, 656, and 658 may also be used as the Nth comparison frame. The process 600 may be repeated to determine an Nth vector for an Mth frame 650 and generate an Nth generated frame 660 for M=1 and N=X. The frame 654 may be used as the Nth comparison to determine the Nth vector for the Mth frame 650 as illustrated. The frames 652, 656, and 658 may also be used as the Nth comparison frame.

By repeating the process 600 for M=Y, Y-1, Y-2, ..., 1, generated frames 660, 662, 664, 666, and 668, are generated for each of the Mth frame 650, 652, 654, 656, or 658, respectively. It is to be appreciated that the generated frames 660, 662, 664, 666, and 668 may be generated in any order. In other words, the frames 660, 662, 664, 666, and 668 may be generated in parallel, in series, or any combination thereof. It is to be further appreciated that the frames 650, 652, 654, 656, or 658 may be designated as Mth frame for any of M=Y, Y-1, Y-2, ..., 1, and the designation shown in FIG. 6b is only to illustrate as such.

Referring to FIGS. 3, 6a, and 6b, the process 600 may further include a creating element 612 for creating composite frames 670, 672, 674, 676, and 678 for each of the Mth frame 650, 652, 654, 656, or 658, respectively. In an embodiment, the image processing system 300 may include an image blending module 306 configured to implement the creating element 612 of the process 600. The image blending module 306 may be operable to receive the Mth frame and the generated frames for the Mth frame and blend them to create a composite frame for the Mth frame. In an embodiment, the image blending module 306 may be operable to receive and blend Mth frames 650, 652, 654, 656, or 658 with the respective generated frames 660, 662, 664, 666, and 668 for M=Y, Y-1, Y-2, ..., 1 to generate the composite Mth frames 670, 672, 674, 676, and 678. It is to be appreciated that the weight of each frames included in the blending can be varied. For example, in an embodiment, the Mth frame 654 and the generated frames 664 may be blending with equal weight. In another exemplary embodiment, Mth frame 654 and the generated frames 664 may be blending with different weight. In an embodiment, any of these frames may be excluded and given no weight. In an embodiment, the Mth frame 654 may be given reduced or no weight because it contains the noise artifact that are undesirable.

In an embodiment, the blending of the Mth frames 650, 652, 654, 656, or 658 with the respective generated frames 660, 662, 664, 666, and 668 allows for some or all of the composite Mth frames 670, 672, 674, 676, and 678 to have a resolution, motion blur, and/or output frame rate that is the same as the respective Mth frames 650, 652, 654, 656, or 658. In another embodiment, the blending of the Mth frames 650, 652, 654, 656, or 658 with the respective generated frames 660, 662, 664, 666, and 668 allows for some or all of the composite Mth frames 670, 672, 674, 676, and 678 to have a resolution, motion blur, and/or output frame rate that is different from that of the respective Mth frames 650, 652, 654, 656, or 658. In an embodiment, the blending may include combining pixel or vector information in the Mth frames 650, 652, 654, 656, or 658 and the respective generated frames 660, 662, 664, 666, and 668 to result in at least one of the composite Mth frames 670, 672, 674, 676, and 678 having a different resolution, motion blur, and/or output frame rate.

The image blending module 306 may include at least one processor, which may include any combination of a computer, a microprocessor, a programmed machine, a server, or any other hardware operable to be configured to implement the processes of the present disclosure. The image blending module 306 may be accessible and communicatively connected to other subsystems of the system 300 over a wide area network (WAN), local area network (LAN), optic fiber, cable channel, satellite network, cellular network, radio network, infrared link, the Cloud, the Internet, or any other wired or wireless communication connection known in the art. The image blending module 306 may be located in one or more locations or in the Cloud.

The composite frames 670, 672, 674, 676, and 678 generated according to any of the processes disclosed herein include image data from a plurality of the temporal and/or perspective frames, and the rejection analysis as discussed above with respect to FIGS. 4 and 5 allows the composite frames 670, 672, 674, 676, and 678 to include image data that is more accurate to the original scene with reduced artifacts.

After the creation of the composite frames 670, 672, 674, 676, and 678, the composite frames 670, 672, 674, 676, and 678 may be stored in an image data store 312 or may undergo further processing in the optional image effect module 308 and/or the optional compression module 310. In accordance with an applying element 614 of the process 600, the composite frame 670 may be modified at the optional image effect module 308 to include intentional noise artifacts, which may be aesthetically desirable in some scene environment. Other visual effects known in the art could also be applied by the image effect module 308 to the composite frame 670, such as grain matching, stock film patterning, sharpening, blurring, motion blur adjustment, etc.

In accordance with a compressing element 616 of the process 600, the composite frames 670, 672, 674, 676, and 678 may be compressed at the optional compression module 310 before being stored in the image data store 312 or before being transmitted downstream. The compression module 310 may apply any standard compression algorithm known in the art, such as MPEG, JPEG, JPEG 2000, H264, H265, TIFF, MOV, AVI, etc. It is to be appreciated that due to the reduced artifacts in the composite frame 600, the compression of the composite frames 670, 672, 674, 676, and 678 may be done more efficiently and synergistically.

Figure 7A:
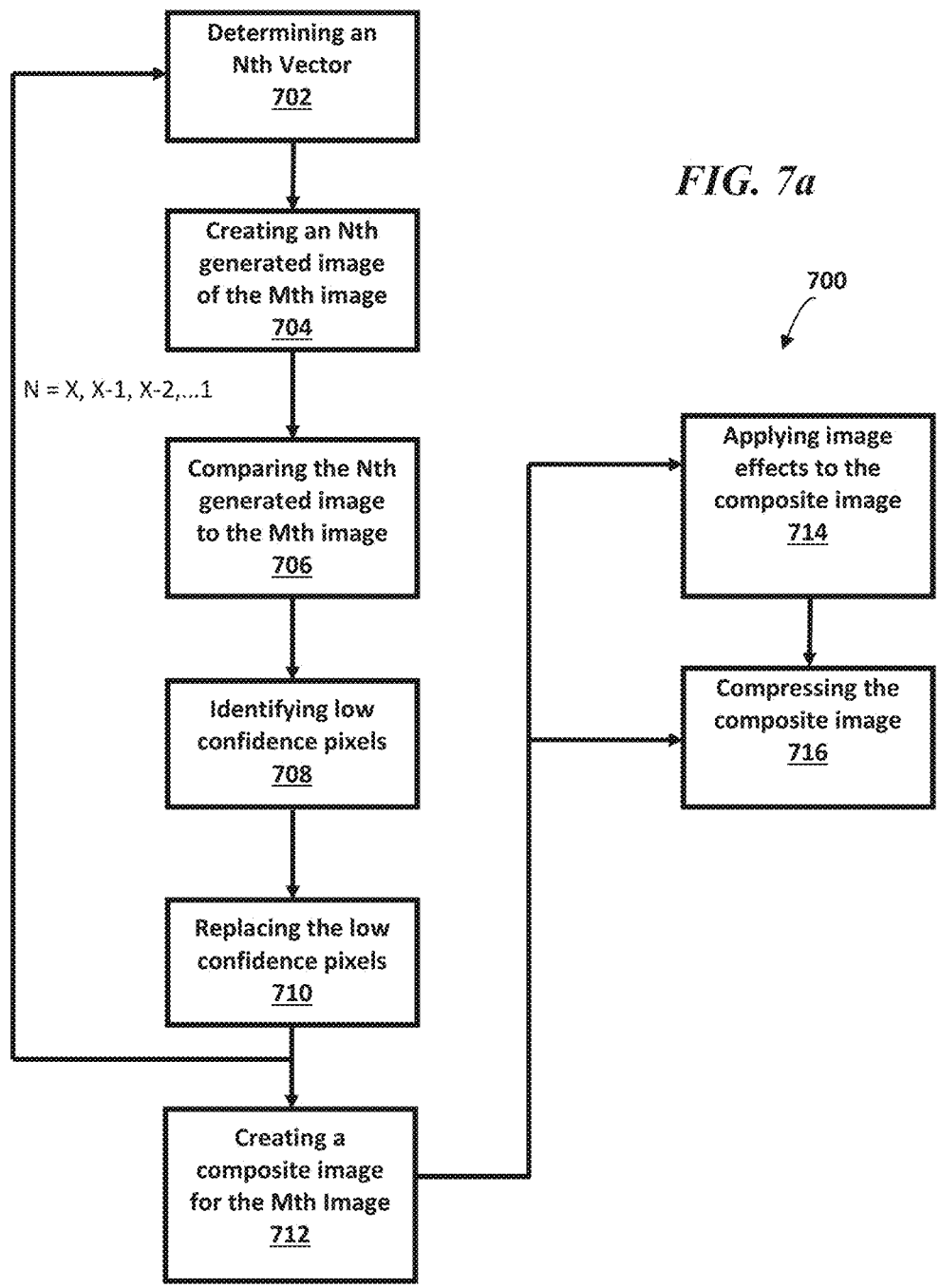
FIG. 7a is a flow diagram illustrating an exemplary bodiment of a process for constructing an image, in accordance with the present disclosure.

FIG. 7a is an exemplary embodiment of a process 700 that may be implemented by the image processing system 300 to generate at least one image frame based on image data for a plurality of image frames. The process 700 may include a determining element 702 that may be similar to the determining element 402 of process 400 discussed above. In the determining element 702, for M being Y and N being X, an Nth vector may be determined for an Mth frame of the plurality of image frames using any embodiments of the vector analyses described herein. X and Y are each a number greater than zero. The Mth frame of the plurality of image frames may be a sequential, perspective, or sequential-perspective. Referring to the embodiments discussed with respect to FIG. 1, the Mth frame for M being Y may be any one of the sequential frames 100, 102, 104, 106, or 108, and in the illustrated embodiment, the Mth frame for M=Y is the t=0 frame 100 as shown in FIG. 1. Referring to the embodiments discussed with respect to FIG. 2, the Mth frame may be any one of the sequential-perspective frames 200, 202, 204, 206, 208, 210, 212, 214, 216, or 218, and in the illustrated embodiment, the Mth frame for M=Y is the first perspective, t=0 frame 214 as shown in FIG. 2.

The Nth vector may be a motion vector, a perspective vector, or a motion-perspective vector for correlating the Mth frame to an Nth comparison frame of the plurality of image frames that is not the Mth frame. Referring to the embodiments discussed with respect to FIG. 1, the Nth comparison frame may be any one of the frames 102, 104, 106, or 108 that is not the Mth frame, and in the illustrated embodiment, the Nth comparison frame for N=X is the t=−1 frame 104 as shown in FIG. 1. Referring to the embodiments discussed with respect to FIG. 2, the Nth comparison frame may be any one of the frames 200, 202, 204, 206, 208, 210, 212, 216, or 218, and in the illustrated embodiment, the Nth comparison frame for N=X is the second perspective, t=−2 frame 104 as shown in FIG. 2.

Turning back to FIG. 7a, after determining the Nth vector, the process 700 may include a creating element 704 that may be similar to the creating element 404 of the process 400 as discussed above. In the creating element 704, an Nth generated frame of the Mth frame is created based on the Nth comparison frame different from the Mth frame and the Nth vector for the Mth frame. Referring to the embodiments discussed with respect to FIG. 1, the Nth generated frame may be any one of the frames 110, 112, 114, or 116 generated for the t=0 frame, and in the illustrated embodiment, the Nth generated frame for N=X is the frame 112 as shown in FIG. 1. Referring to the embodiments discussed with respect to FIG. 2, the Nth generated frame may be any one of the frames 220, 222, 224, 226, and 228 generated for the t=0 frame for the first perspective, and in the illustrated embodiment, the Nth generated frame for N=X is the frame 220 as shown in FIG. 2.

The process 700 may include a rejection analysis for the pixels of the Nth generated frame for the Mth frame. In an embodiment, the process 700 may include a comparing element 706 in which pixels of the Nth generated frame of the Mth frame are compared to pixels of the Mth frame. The process 700 may also include an identifying element 708 in which low-confidence pixels of the Nth generated frame of the Mth frame are identified when a relative difference between the low-confidence pixels and corresponding pixels of the Mth frame is greater than a threshold. The comparing element 706 and the identifying element 708 may be similar to the comparing element 406 and the identifying element 408 of the process 400 discussed above, respectively.

The process 700 may include a replacing element 710 that may be similar to the replacing element 410 of process 400. In the replacing element 710, the low-confidence pixels of the Nth generated frame for the Mth frame may be replaced with pixels determined based upon the pixels of the Mth frame and/or pixels of the Nth generated frame not identified as low-confidence pixels. In an embodiment, the replacing element 710 may include averaging selected pixels from the Mth frame and/or pixels of the Nth generated frame not identified as low-confidence pixels to replace a low-confidence pixel. For each low-confidence pixel, the corresponding pixel and, in some embodiments, the neighboring pixels in the Mth frame may be selected for averaging. It is to be appreciated that the averaging used herein may be any type of average known, including linear averaging, and weighted averaged for various factors, such as proximity to the location of the low-confidence pixels.

At the completion of the determining element 702, creating element 704, comparing element 706, identifying element 708, and replacing element 710, which may be performed by the image processing module 304, an Nth generated frame for the Mth frame is generated for M=Y and N=X. In an embodiment, X may be greater than one, and the process 700 may comprise repeating the determining element 702, creating element 704, comparing element 706, identifying element 708, and replacing element 710 for M=Y and N=X−1 to generate a plurality of Nth generated frames for the Mth frame. In an embodiment, X may be greater than two, and the process 700 may comprise repeating the determining element 702, creating element 704, comparing element 706, identifying element 708, and replacing element 710 to generate an Nth generated frame of the Mth frame for N=X−1, X−2, . . . , 1.

Figure 7B:
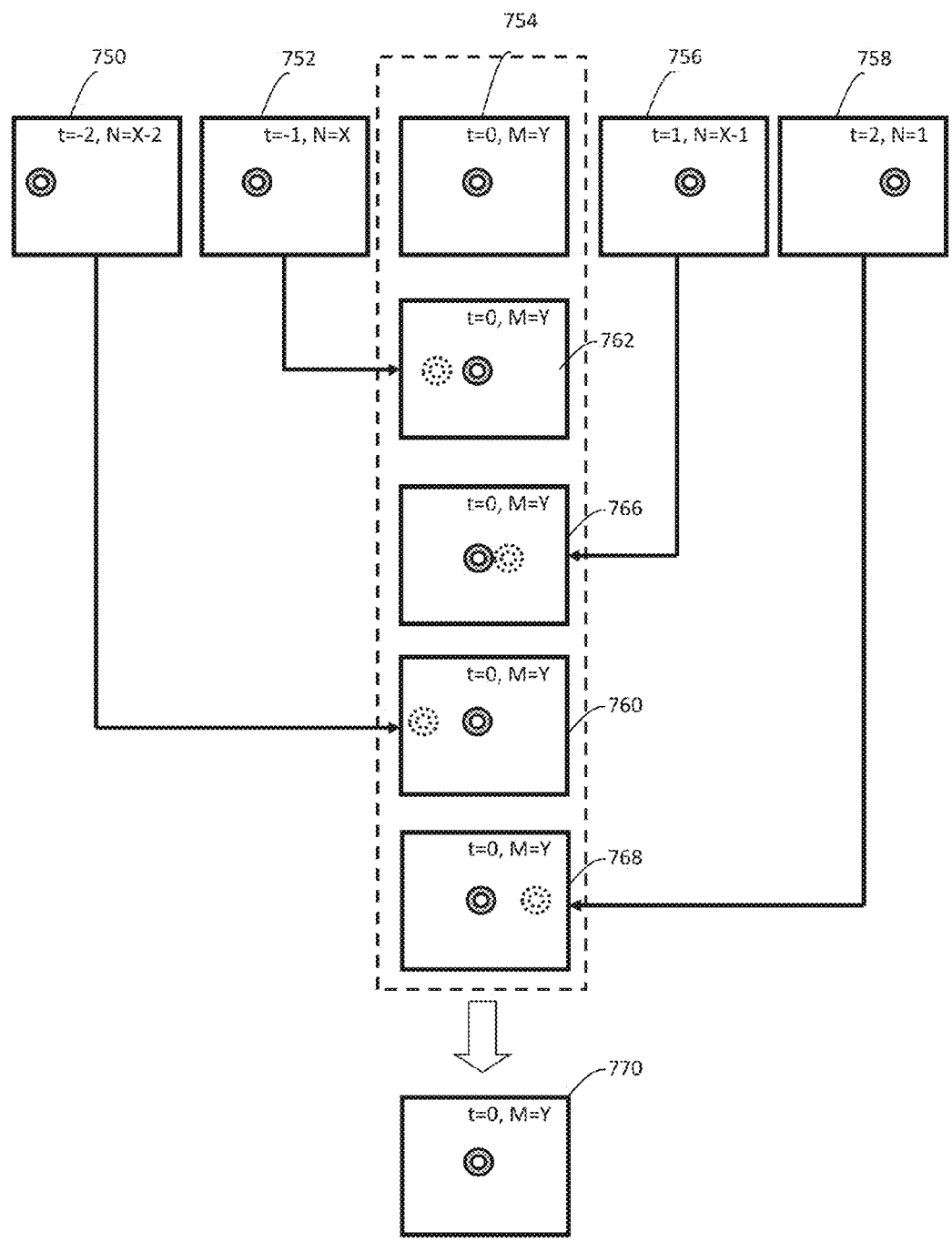
FIG. 7b is a schematic diagram demonstrating an exemplary operation of the process in FIG. 7a, in accordance with the present disclosure.

FIG. 7b is a schematic diagram illustrating the generation of an Nth generated frame of the Mth frame for N=X, X−1, X−2, . . . , 1 based on image data for a plurality of frames 750, 752, 754, 756, and 758. In an embodiment, the plurality of frames of frames 750, 752, 754, 756, and 758 may comprise temporal frames similar to the frames 100, 102, 104, 106, and 108 of FIG. 1. The plurality of frames 750, 752, 754, 756, and 758 may be in a sequential order such that frame 754 is a frame at time being zero, frames 750 and 752 are preceding frames at time being −2 and −1, respectively, and frames 756 and 758 are later frames at time being 1 and 2, respectively. It is to be appreciated that while frames 750, 752, 754, 756, and 758 may be in a certain sequential order, some or all of the frames 750, 752, 754, 756, and 758 may or may not be immediate consecutive frames. Although not illustrated in FIG. 7b, it is to be appreciated that in an embodiment, some or all of the frames 750, 752, 754, 756, and 758 may comprise perspective frames similar to those illustrated in FIG. 2.

The determining element 702 of the process 700 may be performed to determine an Nth vector for an Mth frame, which may be any one of the frames 750, 752, 754, 756, or 758, and in the illustrated embodiment, the Mth frame for M=Y is the t=0 frame 754 as shown in FIG. 7b. The Nth comparison frame for N=X may be any one of the frames 750, 752, 756, or 758 that is not the Mth frame 754 for M=Y, and in the illustrated embodiment, the Nth comparison frame for N=X is the t=−1 frame 752 as shown in FIG. 7b. The creating element 704, comparing element 706, identifying element 708, and replacing element 710 of the process 700 may be performed to generate an Nth generated frame 762 for the Mth frame 754 for M=Y and N=X. The process 700 may be repeated to determine an Nth vector for the Mth frame 754 for M=Y and N=X−1, X−2, 1. For N=X−1, X−2, 1, the Nth comparison frame may be frames 756, 750, and 758, respectively, and the Nth generated frames 766, 760, and 768 may be generated for N=X−1, X−2, 1, respectively. As such, the process 700 has generated Nth generated frames 760, 762, 766, and 768 based on the frames 750, 752, 754, 756, or 758. It is to be appreciated that the generated frames 760, 762, 766, and 768 may be generated in any order. In other words, the frames 760, 762, 766, and 768 may be generated in parallel, in series, or any combination thereof. It is to be further appreciated that anyone of the frames 750, 752, 754, 756, or 758 may be designated as Mth frame and the rest of the frames 750, 752, 754, 756, or 758 may be designated as the Nth comparison frame for any of N=X, X−1, X−2, . . . 1, and the designation shown in FIG. 7b is only to illustrate as such.

Referring to FIGS. 3, 7a, and 7b, the process 700 may further include a creating element 712 for creating a composite frame 770 for the Mth frame 754. The image blending module 306 may be configured to perform the creating element 712 of the process 700. The image blending module 306 may be operable to receive the Mth frame and the generated frames for the Mth frame and blend them to create a composite frame for the Mth frame. In an embodiment, the image blending module 306 may be operable to receive and blend some or all of the Mth frame 754 and the Nth generated frames 760, 762, 766, and 768 for M=Y and N=X, X−1, X−2, and 1 to generate the composite Mth frame 770 for M=Y. It is to be appreciated that the number and choice of frames to be included for blending at the image blending module 306 may be varied and the weight of each frames included in the blending can be varied. For example, in an embodiment, the Mth frame 754 and the Nth generated frames 760, 762, 766, and 768 may be blending with equal weight. In another exemplary embodiment, the Mth frame 754 and the Nth generated frames 760, 762, 766, and 768 may be blending with different weight. In an embodiment, any of these frames may be excluded and given no weight. In an embodiment, the Nth generated frames 762, and 765 may be given more weight since they are based on frames 752 and 756 which may be more similar to the Mth frame 754. In an embodiment, the Mth frame 754 may be given reduced or no weight because it contains the noise artifact that are undesirable.

In an embodiment, the blending of some or all of the Mth frame 754 and the Nth generated frames 760, 762, 766, and 768 allows for the composite Mth frame 770 to have a resolution, motion blur, and/or output frame rate that is the same as the Mth frame 754. In another embodiment, the blending of some or all of the Mth frame 754 and the Nth generated frames 760, 762, 766, and 768 allows for the composite Mth frame 770 to have a resolution, motion blur, and/or output frame rate that is different from that of the Mth frames 754. In an embodiment, the blending may include combining pixel or vector information in the Mth frame 754 and the Nth generated frames 760, 762, 766, and 768 to result in at least one of the composite Mth frames 770 having a different resolution, motion blur, and/or output frame rate.

The composite frame 770 generated according to any of the processes disclosed herein includes image data from a plurality of the temporal and/or perspective frames, and the rejection analysis as discussed above with respect to FIGS. 4 and 5 which allows the composite frame 700 to include image data that is more accurate to the original scene with reduced artifacts.

After the creation of the composite frame 770, the composite frame 770 may be stored in the image data store 312 or may undergo further processing in the optional image effect module 308 and/or the optional compression module 310. In accordance with an applying element 714 of the process 700, the composite frame 770 may be modified at the optional image effect module 308 to include intentional noise artifacts, which may be aesthetically desirable in some scene environment. Other visual effects known in the art could also be applied by the image effect module 308 to the composite frame 770, such as grain matching, stock film patterning, sharpening, blurring, motion blur adjustment, etc.

In accordance with a compressing element 716 of the process 700, the composite frame 770 may be compressed at the optional compression module 310 before being stored in the image data store 312 or before being transmitted downstream. The compression module 310 may apply any standard compression algorithm known in the art, such as MPEG, JPEG, JPEG 2000, H264, H265, TIFF, MOV, AVI, etc. It is to be appreciated that due to the reduced artifacts in the composite frame 700, the compression of the frame 770 may be done more efficiently and synergistically.

Figure 8A:
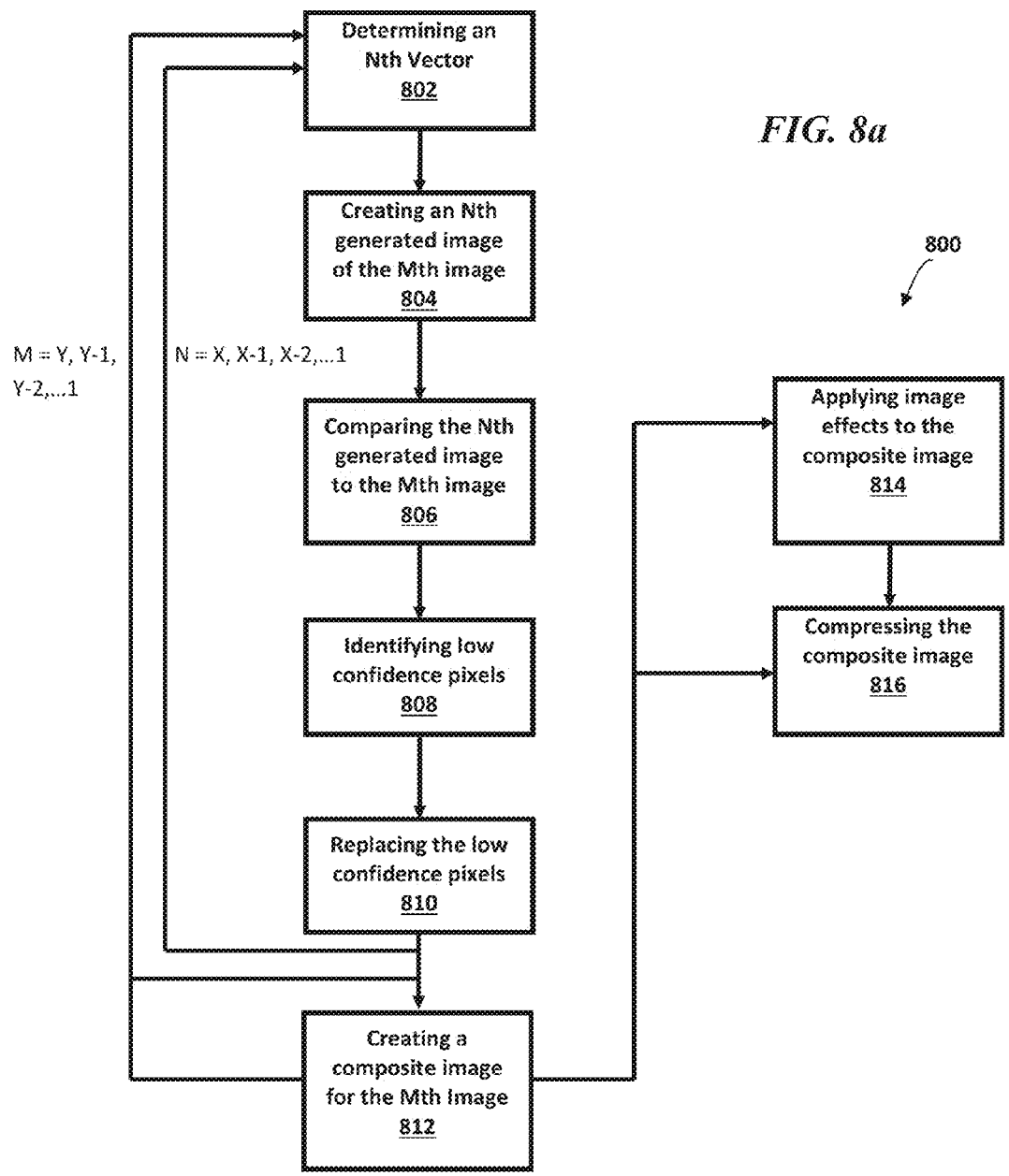
FIG. 8a is a flow diagram illustrating an exemplary bodiment of a process for constructing an image, in accordance with the present disclosure.

FIG. 8a is an exemplary embodiment of a process 800 that may be implemented by the image processing system 300 to generate at least one image frame based on image data for a plurality of image frames. The process 800 may include a determining element 802 that may be similar to the determining element 402 of process 400 discussed above. In the determining element 802, for M being Y and N being X, an Nth vector may be determined for an Mth frame of the plurality of image frames using any embodiments of the vector analyses described herein. X and Y are each a number greater than zero. The Mth frame of the plurality of image frames may be a sequential, perspective, or sequential-perspective. Referring to the embodiments discussed with respect to FIG. 1, the Mth frame for M being Y may be any one of the sequential frames 100, 102, 104, 106, or 108, and in the illustrated embodiment, the Mth frame for M=Y is the t=0 frame 100 as shown in FIG. 1. Referring to the embodiments discussed with respect to FIG. 2, the Mth frame may be any one of the sequential-perspective frames 200, 202, 204, 206, 208, 210, 212, 214, 216, or 218, and in the illustrated embodiment, the Mth frame for M=Y is the first perspective, t=0 frame 214 as shown in FIG. 2.

The Nth vector may be a motion vector, a perspective vector, or a motion-perspective vector for correlating the Mth frame to an Nth comparison frame of the plurality of image frames that is not the Mth frame. Referring to the embodiments discussed with respect to FIG. 1, the Nth comparison frame may be any one of the frames 102, 104, 106, or 108 that is not the Mth frame, and in the illustrated embodiment, the Nth comparison frame for N=X is the t=−1 frame 104 as shown in FIG. 1. Referring to the embodiments discussed with respect to FIG. 2, the Nth comparison frame may be any one of the frames 200, 202, 204, 206, 208, 210, 212, 216, or 218, and in the illustrated embodiment, the Nth comparison frame for N=X is the second perspective, t=−2 frame 104 as shown in FIG. 2.

Turning back to FIG. 8a, after determining the Nth vector, the process 800 may include a creating element 804 that may be similar to the creating element 404 of the process 400 as discussed above. In the creating element 804, an Nth generated frame of the Mth frame is created based on the Nth comparison frame different from the Mth frame and the Nth vector for the Mth frame. Referring to the embodiments discussed with respect to FIG. 1, the Nth generated frame may be any one of the frames 110, 112, 114, or 116 generated for the t=0 frame, and in the illustrated embodiment, the Nth generated frame for N=X is the frame 112 as shown in FIG. 1. Referring to the embodiments discussed with respect to FIG. 2, the Nth generated frame may be any one of the frames 220, 222, 224, 226, and 228 generated for the t=0 frame for the first perspective, and in the illustrated embodiment, the Nth generated frame for N=X is the frame 220 as shown in FIG. 2.

The process 800 may include a rejection analysis for the pixels of the Nth generated frame for the Mth frame. In an embodiment, the process 800 may include a comparing element 806 in which pixels of the Nth generated frame of the Mth frame are compared to pixels of the Mth frame. The process 800 may also include an identifying element 808 in which low-confidence pixels of the Nth generated frame of the Mth frame are identified when a relative difference between the low-confidence pixels and corresponding pixels of the Mth frame is greater than a threshold. The comparing element 806 and the identifying element 808 may be similar to the comparing element 406 and the identifying element 408 of the process 400 discussed above, respectively.

The process 800 may include a replacing element 810 that may be similar to the replacing element 410 of process 400. In the replacing element 810, the low-confidence pixels of the Nth generated frame for the Mth frame may be replaced with pixels determined based upon the pixels of the Mth frame and/or pixels of the Nth generated frame not identified as low-confidence pixels. In an embodiment, the replacing element 810 may include averaging selected pixels from the Mth frame and/or pixels of the Nth generated frame not identified as low-confidence pixels to replace a low-confidence pixel. For each low-confidence pixel, the corresponding pixel and, in some embodiments, the neighboring pixels in the Mth frame may be selected for averaging. It is to be appreciated that the averaging used herein may be any type of average known, including linear averaging, and weighted averaged for various factors, such as proximity to the location of the low-confidence pixels.

At the completion of the determining element 802, creating element 804, comparing element 806, identifying element 808, and replacing element 810, which may be performed by the image processing module 304, an Nth generated frame for the Mth frame is generated for M=Y and N=X. In an embodiment, X may be greater than one, and the process 800 may comprise repeating the determining element 802, creating element 804, comparing element 806, identifying element 808, and replacing element 810 for M=Y and N=X−1 to generate a plurality of Nth generated frames for the Mth frame. In an embodiment, X may be greater than two, and the process 800 may comprise repeating the determining element 802, creating element 804, comparing element 806, identifying element 808, and replacing element 810 to generate an Nth generated frame of the Mth frame for N=X−1, X−2, . . . , 1. Furthermore, in an embodiment, Y may be greater than one, and the process 800 may comprise repeating the determining element 802, creating element 804, comparing element 806, identifying element 808, and replacing element 810 to generate an Nth generated frame of the Mth frame for M=Y−1, thereby creating generated images for at least two frames of the plurality of frames. In an embodiment, Y may be greater than two, and the process 800 may comprise repeating the determining element 802, creating element 804, comparing element 806, identifying element 808, and replacing element 810 to generate an Nth generated frame of the Mth frame for M=Y−1, Y−2, . . . , 1.

Figure 8B:
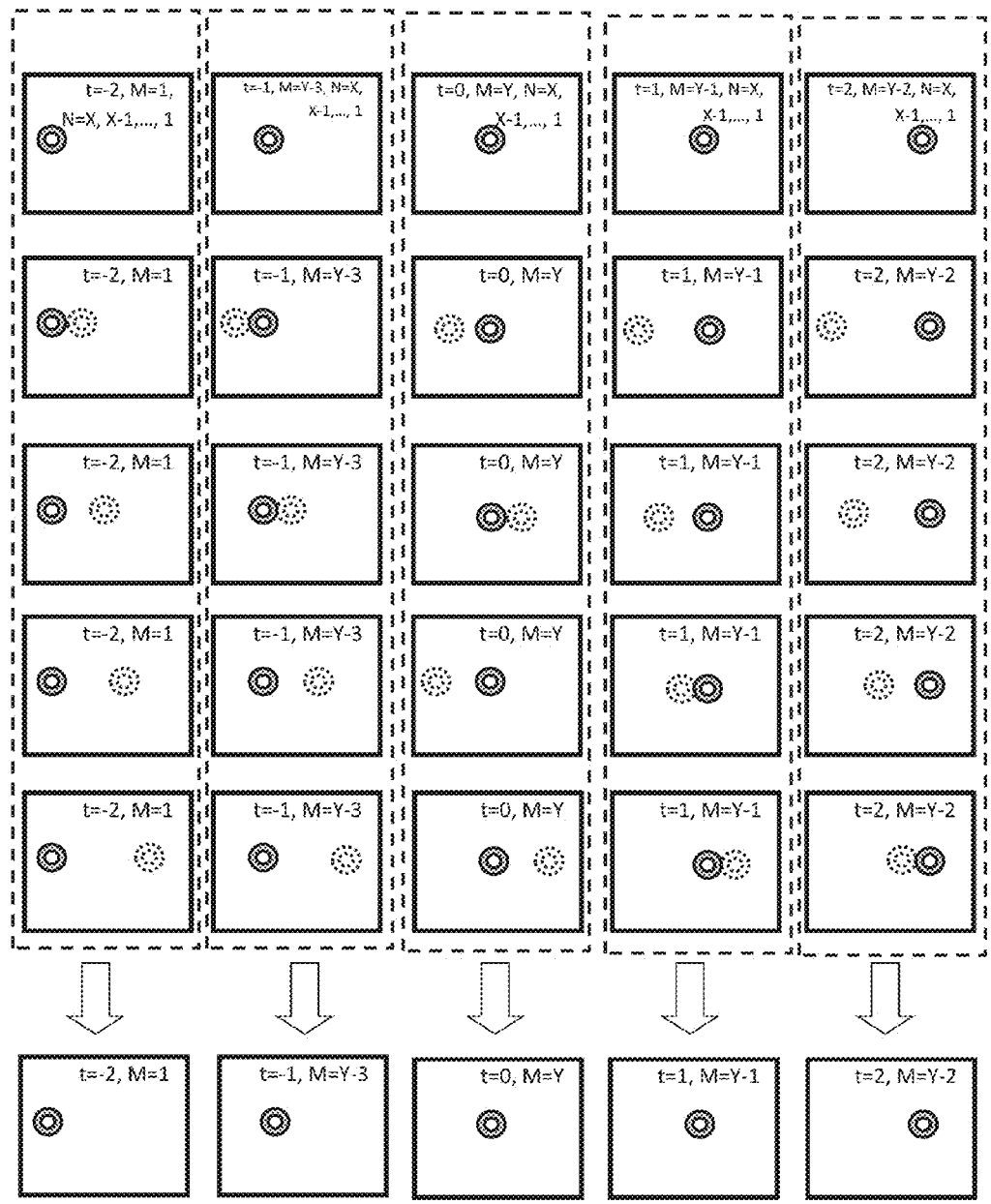
FIG. 8b is a schematic diagram demonstrating an exemplary operation of the process in FIG. 6a, in accordance with the present disclosure.

FIG. 8b is a schematic diagram illustrating the generation of an Nth generated frame of the Mth frame for N=X, X−1, X−2, . . . , 1 and for M=Y, Y−1, Y−2, . . . , 1 based on image data for a plurality of frames 830, 832, 834, 836, and 838. In an embodiment, the plurality of frames of frames 830, 832, 834, 836, and 838 may comprise temporal frames similar to the frames 100, 102, 104, 106, and 108 of FIG. 1. The plurality of frames 830, 832, 834, 836, and 838 may be in a sequential order such that frame 834 is a frame at time being zero, frames 830 and 832 are preceding frames at time being −2 and −1, respectively, and frames 836 and 838 are later frames at time being 1 and 2, respectively. It is to be appreciated that while frames 830, 832, 834, 836, and 838 may be in a certain sequential order, some or all of the frames 830, 832, 834, 836, and 838 may or may not be immediate consecutive frames. Although not illustrated in FIG. 8b, it is to be appreciated that in an embodiment, some or all of the frames 830, 832, 834, 836, and 838 may comprise perspective frames similar to those illustrated in FIG. 2.

The determining element 802 of the process 800 may be performed to determine an Nth vector for an Mth frame, which may be any one of the frames 830, 832, 834, 836, or 838, and in the illustrated embodiment, the Mth frame for M=Y is the t=0 frame 834 as shown in FIG. 7b. The Nth comparison frame for N=X may be any one of the frames 830, 832, 836, or 838 that is not the Mth frame 834 for M=Y, and in the illustrated embodiment, the Nth comparison frame for N=X is the t=−1 frame 832 as shown in FIG. 7b. The creating element 804, comparing element 806, identifying element 808, and replacing element 810 of the process 800 may be performed to generate an Nth generated frame 842 for the Mth frame 834 for M=Y and N=X. The process 800 may be repeated to determine an Nth vector for the Mth frame 834 for M=Y and N=X−1, X−2, 1. For N=X−1, X−2, 1, the Nth comparison frame may be frames 836, 830, and 838, respectively, and the Nth generated frames 846, 840, and 848 may be generated for N=X−1, X−2, 1, respectively. As such, the process 800 has generated Nth generated frames 840, 842, 846, and 848 based on the frames 830, 832, 834, 836, or 838.

In an embodiment the process 800 may further includes repeating the creating element 804, comparing element 806, identifying element 808, and replacing element 810 of the process 800 as described above to generate an Nth generated frame for the Mth frame for M=Y−1, Y−2, . . . , 1 and N=X, X−1, X−2, . . . , 1. The process 800 may be repeated to determine an Nth vector for an Mth frame 836 for M=Y−1 and N=X, X−1, X−2, . . . 1 and generate Nth generated frame 850, 852, 854, and 858. The same may be done to determine an Nth vector for an Mth frame 832 for M=Y−2 and N=X, X−1, X−2, . . . 1 and generate Nth generated frame 860, 864, 866, and 868. The same may be done to determine an Nth vector for an Mth frame 838 for M=Y−3 and N=X, X−1, X−2, . . . 1 and generate Nth generated frame 870, 872, 874, and 876. The same may be done to determine an Nth vector for an Mth frame 830 for M=1 and N=X, X−1, X−2, . . . 1 and generate Nth generated frame 882, 884, 886, and 888.

By repeating the creating element 804, comparing element 806, identifying element 808, and replacing element 810 of the process 800 for M=Y, Y−1, Y−2, . . . 1 and N=X, X−1, X−2, . . . , 1, a plurality of Nth generated frames for each Mth frame. In particular, generated frames 840, 842, 846, and 848 are generated for the Mth frame 834, generated frames 850, 852, 854, and 858 are generated for the Mth frame 836, generated frames 860, 864, 866, and 868 are generated for the Mth frame 832, generated frames 870, 872, 874, and 876 are generated for the Mth frame 838, and generated frames 882, 884, 886, and 888 are generated for the frame 830.

It is to be appreciated that the generated frames 840, 842, 846, 848, 850, 852, 854, 858, 860, 864, 866, 868, 870, 872, 874, 876, 882, 884, 886, and 888 may be generated in any order. In other words, the frames 840, 842, 846, 848, 850, 852, 854, 858, 860, 864, 866, 868, 870, 872, 874, 876, 882, 884, 886, and 888 be generated in parallel, in series, or any combination thereof. It is to be further appreciated that anyone of the frames 830, 832, 834, 836, or 838 may be designated as Mth frame and the rest of the frames 830, 832, 834, 836, or 838 may be designated as the Nth comparison frame for any of N=X, X−1, X−2, . . . 1, and the designation shown in FIG. 8b is only to illustrate as such.

Referring to FIGS. 3, 8a, and 8b, the process 800 may further include a creating element 812 for creating a composite frame 894 for the Mth frame 834. The image blending module 306 may be configured to perform the creating element 812 of the process 800. The image blending module 306 may be operable to receive the Mth frame and the generated frames for the Mth frame and blend them to create a composite frame for the Mth frame. In an embodiment, the image blending module 306 may be operable to receive and blend some or all of the Nth generated frames 840, 842, 846, 848, 850, 852, 854, 858, 860, 864, 866, 868, 870, 872, 874, 876, 882, 884, 886, and 888 to generate a composite Mth frame for the respective Mth frame. In other words, the generated frames 840, 842, 846, and 848 and the Mth frame 834 may be blended to generate a composite Mth frame 894 for the Mth frame 834. The generated frames 850, 852, 854, and 858 and the Mth frame 836 may be blended to generate a composite Mth frame 896 for the Mth frame 836, the generated frames 860, 864, 866, and 868 and the Mth frame 832 may be blended to generate a composite Mth frame 892 for the Mth frame 832, the generated frames 870, 872, 874, and 876 and the Mth frame 838 may be blended to generate a composite Mth frame 898 for the Mth frame 838, and the generated frames 882, 884, 886, and 888 and the Mth frame 830 may be blended to generate a composite Mth frame 890 for the Mth frame 830.

It is to be appreciated that the number and choice of frames to be included for blending at the image blending module 306 may be varied and the weight of each frames included in the blending can be varied. For example, in an embodiment, the Mth frame 834 and the Nth generated frames 840, 842, 846, and 848 may be blending with equal weight. In another exemplary embodiment, the Mth frame 834 and the Nth generated frames 840, 842, 846, and 848 may be blending with different weight. In an embodiment, any of these frames may be excluded and given no weight. In an embodiment, the Nth generated frames 842, and 846 may be given more weight since they are based on frames 832 and 836 which may be more similar to the Mth frame 834. In an embodiment, the Mth frame 834 may be given reduced or no weight because it contains the noise artifact that are undesirable.

The composite frames generated according to any of the processes disclosed herein, such as composite frames 890, 892, 894, 896, and 898, include image data from a plurality of the temporal and/or perspective frames. The contribution from a plurality of frames along with the rejection analysis as discussed above with respect to FIGS. 4 and 5 allows the composite frames to include image data that is more accurate to the original scene with reduced artifacts.

After the creation of the composite frames 890, 892, 894, 896, and 898, the composite frames 890, 892, 894, 896, and 898 may be stored in the image data store 312 or may undergo further processing in the optional image effect module 308 and/or the optional compression module 310. In accordance with a compressing element 816 of the process 800, the composite frames 890, 892, 894, 896, and 898 may be compressed at the optional compression module 310 before being stored in the image data store 312 or before being transmitted downstream.

Figure 9A:
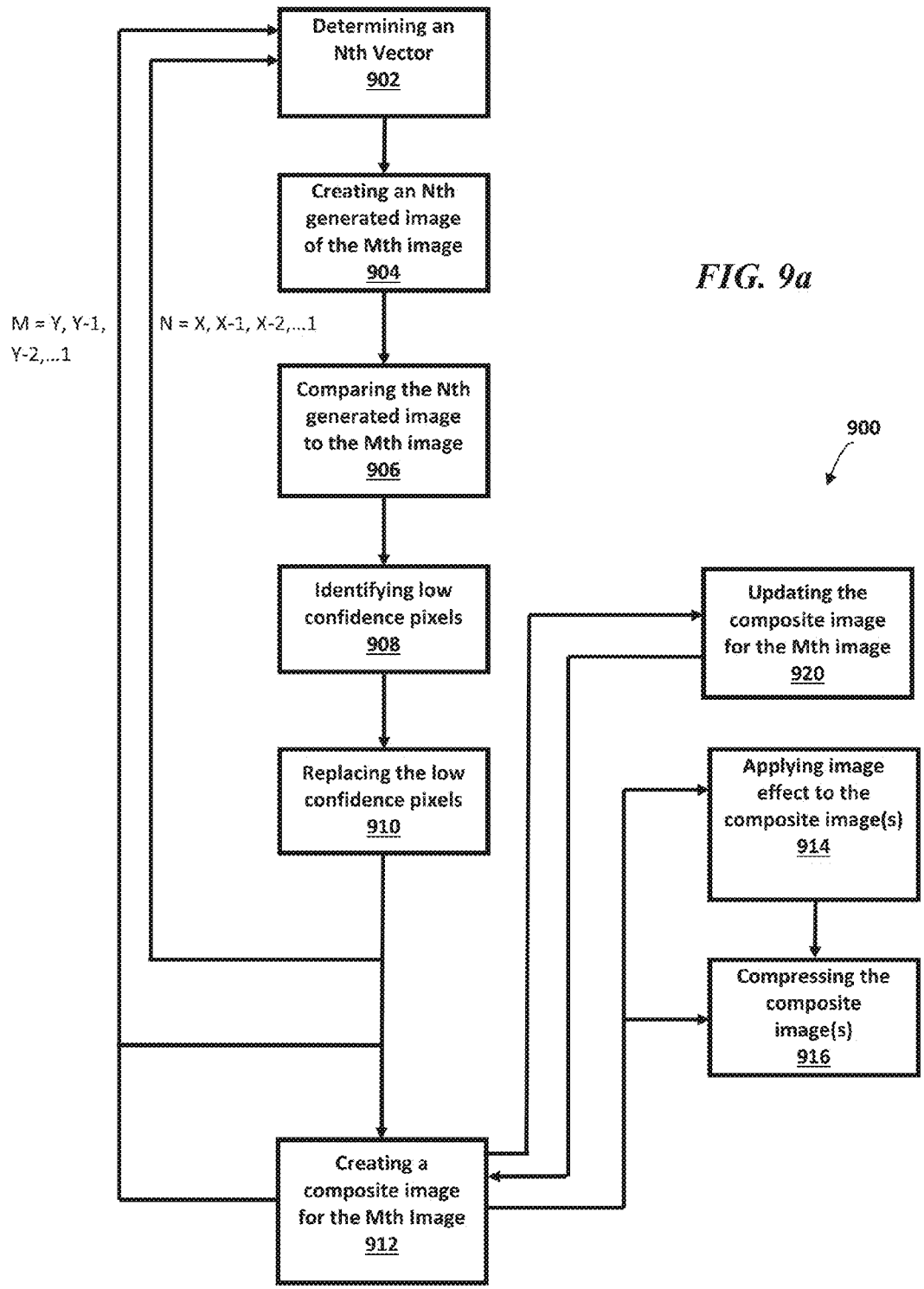
FIG. 9a is a flow diagram illustrating an exemplary bodiment of a process for constructing an image, in accordance with the present disclosure.

FIG. 9a is an exemplary embodiment of a process 900, which may incorporate some or all of the processes 400, 600, 700, 800 disclosed herein, and may be implemented by the image processing system 300 to generate at least one image frame based on image data for a plurality of image frames. The process 900 may include a determining element 902 that may be similar to the determining element 402 of the process 400, the determining element 602 of the process 600, the determining element 702 of the process 700, and the determining element 802 of the process 800. In the determining element 902, for M being Y and N being X, an Nth vector may be determined for an Mth frame of the plurality of image frames in accordance with any embodiments of the vector analyses described herein. X and Y are each a number greater than zero. After determining the Nth vector, the process 900 may include a creating element 904 that may be similar to the creating element 404 of the process 400, the creating element 602 of the process 600, the creating element 702 of the process 700, and the creating element 802 of the process 800 as discussed above. In the creating element 904, an Nth generated frame of the Mth frame is created based on the Nth comparison frame different from the Mth frame and the Nth vector for the Mth frame. In accordance with any embodiments of the rejction analysis described herein, the process 900 may include a comparing element 906 in which pixels of the Nth generated frame of the Mth frame are compared to pixels of the Mth frame and an identifying element 908 in which low-confidence pixels of the Nth generated frame of the Mth frame are identified when a relative difference between the low-confidence pixels and corresponding pixels of the Mth frame is greater than a threshold. The comparing element 906 may be similar to the comparing element 406, 606, 706, and 806 of the processes 400, 600, 700, and 800 as discussed above, respectively. The identifying element 908 may be similar to the comparing element 408, 608, 708, and 808 of the processes 400, 600, 700, and 800 as discussed above, respectively.

The process 900 may include a replacing element 910 that may be similar to the replacing element 410, 610, 710, and 810 of the processes 400, 600, 700, and 800 as discussed above, respectively. In the replacing element 910, the low-confidence pixels of the Nth generated frame for the Mth frame may be replaced with pixels determined based upon the pixels of the Mth frame and/or pixels of the Nth generated frame not identified as low-confidence pixels. In an embodiment, the replacing element 910 may include averaging selected pixels from the Mth frame and/or pixels of the Nth generated frame not identified as low-confidence pixels to replace a low-confidence pixel. For each low-confidence pixel, the corresponding pixel and, in some embodiments, the neighboring pixels in the Mth frame may be selected for averaging.

In an embodiment, X may be greater than one, and the process 900 may comprise repeating the determining element 902, creating element 904, comparing element 906, identifying element 908, and replacing element 910 to generate a plurality of Nth generated frames for the Mth frame for M=Y and N=X-1. In an embodiment, X may be greater than two, and the process 900 may comprise repeating the determining element 902, creating element 904, comparing element 906, identifying element 908, and replacing element 910 to generate an Nth generated frame of the Mth frame for N=X-1, X-2, . . . , 1. Furthermore, in an embodiment, Y may be greater than one, and the process 900 may comprise repeating the determining element 902, creating element 904, comparing element 906, identifying element 908, and replacing element 910 to generate Nth generated frames of the Mth frame for M=Y-1, thereby creating generated images for at least two frames of the plurality of frames. In an embodiment, Y may be greater than two, and the process 900 may comprise repeating the determining element 902, creating element 904, comparing element 906, identifying element 908, and replacing element 910 to generate Nth generated frames of the Mth frame for M=Y-1, Y-2, . . . , 1.

Referring to FIGS. 3 and 9a, the process 900 may further include a creating element 912 for creating a composite frame for the Mth frame for M=Y, Y-1, Y-2, . . . , 1. The image blending module 306 may be configured to perform the creating element 912 of the process 900. The image blending module 306 may be operable to receive the Mth frame and the generated frames for the Mth frame as prepared by the determining element 902, creating element 904, comparing element 906, identifying element 908, and replacing element 910 of process 900 as discussed above and blend them to create a composite frame for the Mth frame for M=Y, Y-1, Y-2, . . . , 1.

After the creation of a composite frame for the Mth frame, the composite frame may be stored in the image data store 312 or may undergo further processing in the optional image effect module 308 in accordance with an applying element 914 and/or the optional compression module 310 in accordance with a compressing element 916. In the applying element 914 of the process 900, a composite frame may be modified at the optional image effect module 308 to include intentional noise artifacts and/or other visual effects known in the art. In the compressing element 916 of the process 900, a composite frame may be compressed at the optional compression module 310 before being stored in the image data store 312 or before being transmitted downstream.

The process 900 may be further configured to include an updating element 920 for updating the composite frames generated in the creating element 912 of the process 900 iteratively. The updating element 920 may be performed by the image generation module 304 of FIG. 3. In an embodiment, the composite frames for the Mth frame for M=Y, Y-1, Y-2, . . . , 1 may be updated by analyzing the composite frames themselves in accordance to any embodiment of the vector analysis and rejection analysis described herein.

Figure 9B:
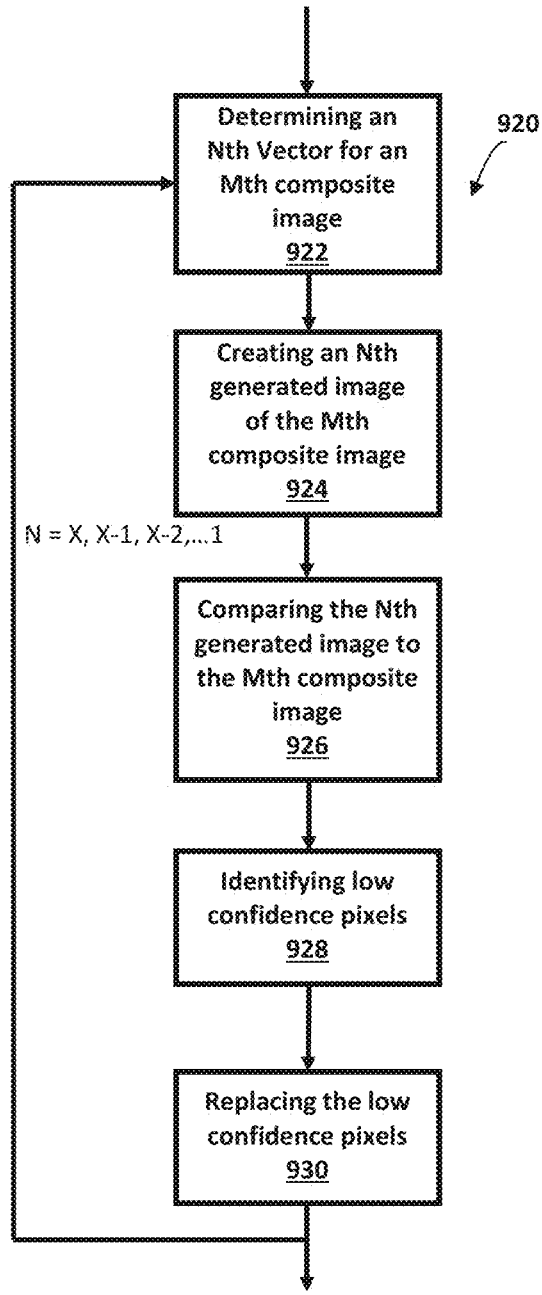
FIG. 9b is a schematic diagram illustrating an exemplary bodiment of the updating element of the process in FIG. 9a, in accordance with the present disclosure.

FIG. 9b is a flow chart diagram illustrating an exemplary embodiment of the updating element 920. In an embodiment, the updating element 920 may include a determining element 922 in which, an Nth vector for an Mth composite frame of the composite frames generated as discussed above may be determined for M being Y and N being X. X and Y may each be a number greater than zero, and the Nth vector correlates the Mth composite frame to an Nth comparison composite frame of the composite frames different from the Mth composite frame. In an embodiment, the Nth vector for the Mth composite frame may be determined the same way the Nth vector for the Mth frame is determined as discussed above with respect to FIGS. 5a and 5b.

The updating element 920 may further includes a creating element 922 in which an Nth generated frame of the Mth composite frame may be created based on the Nth comparison composite frame different from the Mth composite frame and the Nth vector for the Mth composite frame. The coordinates of the Nth vector for the Mth composite frame allow for a reconstruction of the Mth composite frame from the Nth comparison composite frame. In an embodiment, the Nth generated frame of the Mth composite frame may be created the same way the Nth generated frame of the Mth frame is created as discussed above with respect to FIG. 5c.

The updating element 920 may include a rejection analysis for the pixels of the Nth generated frame for the Mth composite frame. In an embodiment, the updating element 920 may include a comparing element 926 in which pixels of the Nth generated frame of the Mth composite frame are compared to pixels of the Mth composite frame. The updating element 920 may also include an identifying element 928 in which low-confidence pixels of the Nth generated frame of the Mth composite frame are identified when a relative difference between the low-confidence pixels and corresponding pixels of the Mth frame is greater than a threshold. In an embodiment, the pixels of the Nth generated frame of the Mth composite frame may be compared to the pixels of the Mth composite frame and the low-confidence pixels may be identified the same way as the comparing element 406 and the identifying element 408 are performed as discussed above with respect to FIG. 5d.

The updating element may include a replacing element 930, in which, the low-confidence pixels of the Nth generated frame for the Mth composite frame may be replaced with pixels determined based upon the pixels of the Mth composite frame and/or pixels of the Nth generated frame for the Mth composite frame. In an embodiment, the replacing element 930 may include averaging selected pixels from the Mth composite frame and/or pixels of the Nth generated frame for the mth composite frame to replace a low-confidence pixel. For each low-confidence pixel, the corresponding pixel and, in some embodiments, the neighboring pixels in the Mth composite frame may be selected for averaging.

In an embodiment, X may be greater than one, and the updating element 920 may be repeated for N being X−1, thereby creating at least two generated frames for the Mth composite frame. In an embodiment, X may be greater than two, and the process 920 may be repeated for N=X−1, X−2, . . . , 1 to generate an Nth generated frame of the Mth composite frame for N=X−1, X−2, . . . , 1. After the updating element 920 is performed to create a plurality of Nth generated frames, the creating element 912 may be repeated to blending the at least two generated frames of the Mth composite frame to create an updated composite frame for the Mth frame.

An updated composite frame for the Mth frame may be created for the Mth frame for M being other than Y. The updating element 920 may be repeated for M=Y−1 in an embodiment Y is greater than one, thereby creating generated frames for the at least two Mth composite frames. The updating element 920 may be repeated for M=Y−1, Y−2, . . . , 1 in an embodiment Y is greater than two. After the updating element 920 is performed to create a plurality of Nth generated frames, the creating element 912 may be repeated to blending the generated frames of the Mth composite frames to create updated composite frames for the Mth frames.

It is to be appreciated that the above discussed repeating of the element 920 for different values of N and M may be performed in any order, such as in series, parallel, or in any combination thereof.

It is to be also appreciated that the completion of repeating the creating element 912 to create updated composite frames may be considered as a second iteration of creating composite frames for the Mth frames. In an embodiment, one or more portion of the updated composite frames for the Mth frames may have less noise artifacts and more accurate pixel data than the first iteration of the composite frames for the Mth frames because an additional iteration through the vector and rejection analyses allows benefits of vector and rejection analyses of the present disclosure to be cumulatively increased. As such, one may appreciate that the updating element 920 may be repeated more than once for additional iterations to further reduce artifacts and improve the accuracy of the pixel data in at least some portions of the composite frame of the Mth frame. However, each additional iteration through the updating element 920 may require additional computing power and extend computing time.

It is to be appreciated that the iterative updating element 920 may be adapted and incorporated in any embodiment of the present disclosure, including processes 400, 600, 700, and 800 for synergistic results. The updating element 920 may be adapted for all or some portions of the processes 400, 600, 700, and 800.

Figure 10A:
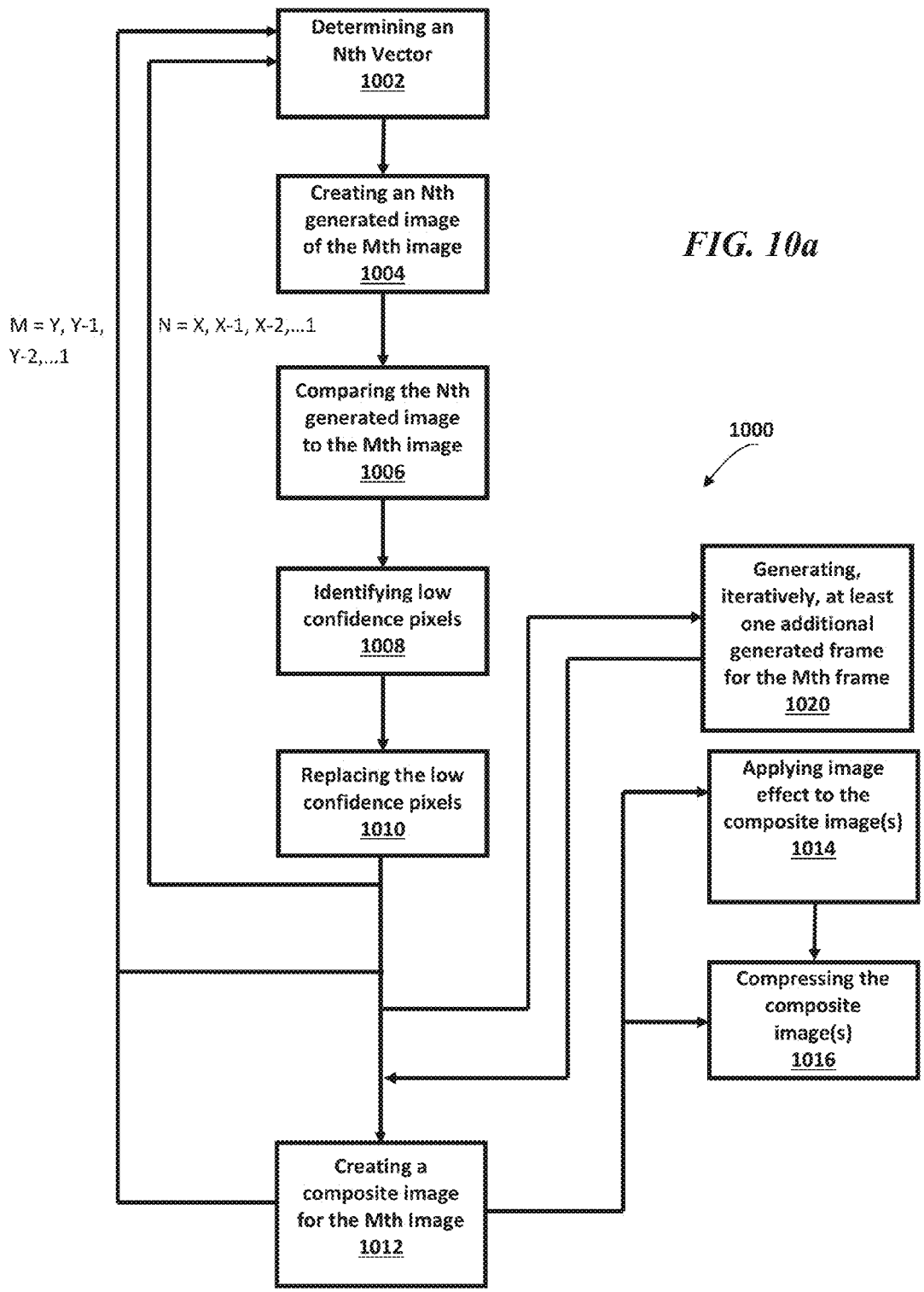
FIG. 10a is a flow diagram illustrating an exemplary bodiment of a process for constructing an image, in accordance with the present disclosure.

FIG. 10a is an exemplary embodiment of a process 1000, which may incorporate some or all of the processes 400, 600, 700, 800, and 900 disclosed herein, and may be implemented by the image processing system 300 to generate at least one image frame based on image data for a plurality of image frames. The process 1000 may include a determining element 1002 that may be similar to the determining element 402 of the process 400, the determining element 602 of the process 600, the determining element 702 of the process 700, the determining element 802 of the process 800, and the determining element 902 of the process 900. In the determining element 1002, for M being Y and N being X, an Nth vector may be determined for an Mth frame of the plurality of image frames in accordance with any embodiments of the vector analyses described herein. X and Y are each a number greater than zero. After determining the Nth vector, the process 1000 may include a creating element 1004 that may be similar to the creating element 404 of the process 400, the creating element 602 of the process 600, the creating element 702 of the process 700, the creating element 802 of the process 800, and the creating element 904 of the process 900 as discussed above. In the creating element 1004, an Nth generated frame of the Mth frame is created based on the Nth comparison frame different from the Mth frame and the Nth vector for the Mth frame. In accordance with any embodiments of the rejction analysis described herein, the process 1000 may include a comparing element 1006 in which pixels of the Nth generated frame of the Mth frame are compared to pixels of the Mth frame and an identifying element 1008 in which low-confidence pixels of the Nth generated frame of the Mth frame are identified when a relative difference between the low-confidence pixels and corresponding pixels of the Mth frame is greater than a threshold. The comparing element 1006 may be similar to the comparing element 406, 606, 706, 806, and 906 of the processes 400, 600, 700, 800, and 900 as discussed above, respectively. The identifying element 1008 may be similar to the comparing element 408, 608, 708, 808, and 908 of the processes 400, 600, 700, 800 and 900 as discussed above, respectively.

The process 1000 may include a replacing element 1010 that may be similar to the replacing element 410, 610, 710, 810 and 910 of the processes 400, 600, 700, 800 and 900 as discussed above, respectively. In the replacing element 1010, the low-confidence pixels of the Nth generated frame for the Mth frame may be replaced with pixels determined based upon the pixels of the Mth frame and/or pixels of the Nth generated frame not identified as low-confidence pixels. In an embodiment, the replacing element 1010 may include averaging selected pixels from the Mth frame and/or pixels of the Nth generated frame not identified as low-confidence pixels to replace a low-confidence pixel. For each low-confidence pixel, the corresponding pixel and, in some embodiments, the neighboring pixels in the Mth frame may be selected for averaging.

In an embodiment, X may be greater than one, and the process 1000 may comprise repeating the determining element 1002, creating element 1004, comparing element 1006, identifying element 1008, and replacing element 1010 to generate a plurality of Nth generated frames for the Mth frame for M=Y and N=X−1. In an embodiment, X may be greater than two, and the process 1000 may comprise repeating the determining element 1002, creating element 1004, comparing element 1006, identifying element 1008, and replacing element 1010 to generate a plurality of Nth generated frames for the Mth frame for M=Y and N=X−1, X−2, . . . , 1. Furthermore, in an embodiment, Y may be greater than one, and the process 1000 may comprise repeating the determining element 1002, creating element 1004, comparing element 1006, identifying element 1008, and replacing element 1010 to generate at least one Nth generated frame of the Mth frame for M=Y−1, thereby creating generated frames for at least two frames of the plurality of frames. In an embodiment, Y may be greater than two, and the process 1000 may comprise repeating the determining element 1002, creating element 1004, comparing element 1006, identifying element 1008, and replacing element 1010 to generate at least one Nth generated frames of the Mth frame for M=Y−1, Y−2, . . . , 1.

Referring to FIGS. 3 and 10*a*, the process 1000 may further include a creating element 1012 for creating a composite frame for the Mth frame for M=Y, Y−1, Y−2, . . . , 1. The image blending module 306 may be configured to perform the creating element 1012 of the process 1000. The image blending module 306 may be operable to receive the Mth frame and the Nth generated frames for the Mth frame as for M=Y, Y−1, Y−2, . . . , 1 and N=X, X−1, X−2, . . . , 1. The image blending module 306 may be further operable to blend some or all of the Mth frame and the Nth generated frames for the Mth frame to create a composite frame for the Mth frame.

After the creation of a composite frame for the Mth frame, the composite frame may be stored in the image data store 312 or may undergo further processing in the optional image effect module 308 in accordance with an applying element 1014 and/or the optional compression module 310 in accordance with a compressing element 1016. In the applying element 1014 of the process 1000, a composite frame may be modified at the optional image effect module 308 to include intentional noise artifacts and/or other visual effects known in the art. In the compressing element 1016 of the process 1000, a composite frame may be compressed at the optional compression module 310 before being stored in the image data store 312 or before being transmitted downstream.

To realize synergistic benefits similar to those associated with iteratively updating a composite frame as discussed above, in an embodiment, the process 1000 may be adapted to include one or more iterative element in accordance with the principles disclosed herein. In an exemplary embodiment, the process 1000 may include an iterative generating element 1020 for generating, iteratively, at least one additional generated frame. In an embodiment, the image data in the Nth generated frames for the Mth frame for M=Y, Y−1, Y−2, . . . , 1 and N=X, X−1, X−2, . . . , 1 generated as discussed above may be used to generate a new iteration of Nth generated frames for the Mth frame. In an embodiment, the additional iteratively generated frames may replace the previous iteration of generated frames and may be blended to create a composite frame for the Mth frame for M=Y, Y−1, Y−2, . . . , 1. In another embodiment, the additional iteratively generated frames may blended with the previous iteration of generated frames to create a composite frame for the Mth frame for M=Y, Y−1, Y−2, . . . , 1. The iteratively generated frames may be generated at the image generation module 304 by analyzing a previous iteration of the generated frames in accordance to any embodiment of the vector analysis and rejection analysis described herein.

Figure 10B:
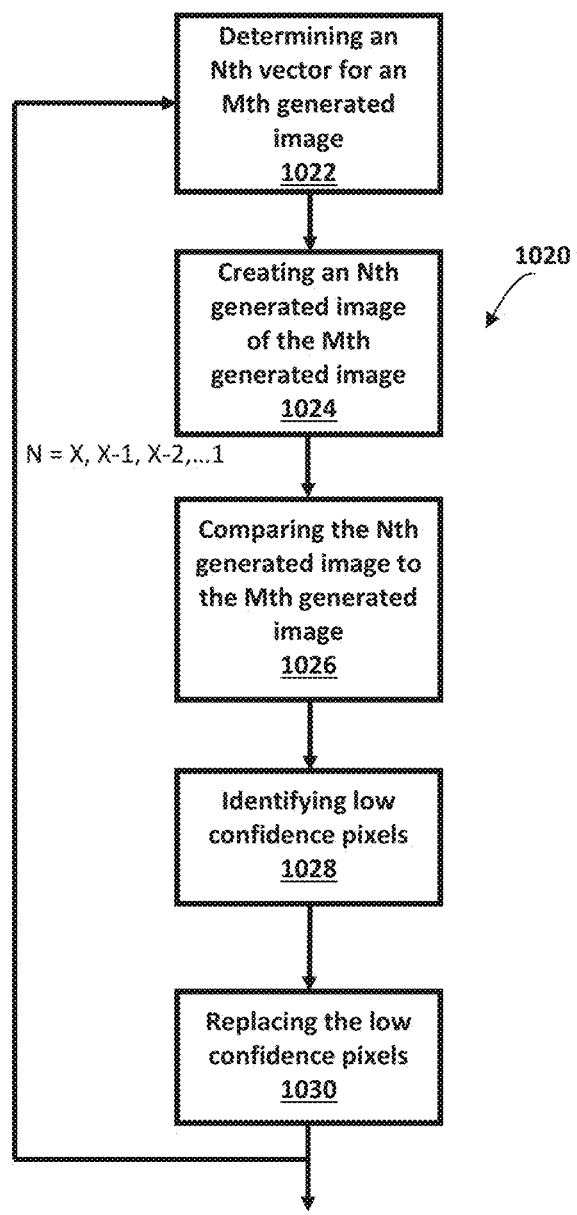
FIG. 10b is a schematic diagram illustrating an exemplary bodiment of the iterative generating element of the process in FIG. 10a, in accordance with the present disclosure.

FIG. 10*b* is a flow chart diagram illustrating an exemplary embodiment of the iterative generating element 1020. In an embodiment, the iterative generating element 1020 may include a determining element 1022 in which, an Nth vector for an Mth generated frame may be determined for M being Y and N being X. X and Y may each be a number greater than zero, and the Nth vector may correlate the Mth generated frame to an Nth comparison frame for the Mth generated frame. The Nth comparison frame may be one of the plurality of frames that is not the Mth frame or one of the plurality of generated frames that is not the Mth generated frame. In an embodiment, the Nth vector for the Mth generated frame may be determined the same way the Nth vector for the Mth frame is determined as discussed above with respect to FIGS. 5*a* and 5*b*.

The iterative generating element 1020 may further includes a creating element 1022 in which an Nth iteratively generated frame of the Mth generated frame may be created based on the Nth comparison frame for the Mth generated frame and the Nth vector for the Mth generated frame. The coordinates of the Nth vector for the Mth generated frame allow for a reconstruction of the Mth generated frame from the Nth comparison frame for the Mth generated frame. In an embodiment, the Nth iteratively generated frame for the Mth generated frame may be created the same way the Nth generated frame of the Mth frame is created as discussed above with respect to FIG. 5*c*.

The iterative generating element 1020 may include a rejection analysis for the pixels of the Nth iteratively generated frame for the Mth generated frame. In an embodiment, the iterative generating element 1020 may include a comparing element 1026 in which pixels of the Nth iteratively generated frame of the Mth generated frame are compared to pixels of the Mth generated frame. The iterative generating element 1020 may also include an identifying element 1028 in which low-confidence pixels of the Nth iteratively generated frame of the Mth generated frame are identified when a relative difference between the low-confidence pixels and corresponding pixels of the Mth frame is greater than a threshold. In an embodiment, the pixels of the Nth iteratively generated frame of the Mth generated frame may be compared to the pixels of the Mth generated frame and the low-confidence pixels may be identified the same way as the comparing element 406 and the identifying element 408 are performed as discussed above with respect to FIG. 5*d*.

The iterative generating element 1020 may include a replacing element 930, in which, the low-confidence pixels of the Nth iteratively generated frame for the Mth generated frame may be replaced with pixels determined based upon the pixels of the Mth generated frame and/or pixels of the Nth iteratively generated frame for the Mth generated frame. In an embodiment, the replacing element 930 may include averaging selected pixels from the Mth generated frame and/or pixels of the Nth iteratively generated frame for the Mth generated frame to replace a low-confidence pixel. For each low-confidence pixel, the corresponding pixel and, in some embodiments, the neighboring pixels in the Mth generated frame may be selected for averaging.

In an embodiment, X may be greater than one, and the iterative generating element 1020 may be repeated for N being X−1, thereby creating at least two generated frames for the Mth generated frame. In an embodiment, X may be greater than two, and the element 1020 may be repeated for N=X−1, X−2, . . . , 1 to generate an Nth generated frame of the Mth generated frame for N=X−1, X−2, . . . , 1. After the iterative generating element 1020 is performed to create a plurality of Nth iteratively generated frames, the creating element 1012 may blend the at least two of the plurality of Nth iteratively generated frames of the Mth generated frame to create a composite frame for the Mth frame. As discussed above, in an embodiment, the Nth iteratively generated frames may replace the previous iteration of generated frames and may be blended to create a composite frame for the Mth frame. In another embodiment, the Nth iteratively generated frames may blended with the previous iteration of generated frames (e.g., the Nth generated frames) to create a composite frame for the Mth frame.

An Nth iteratively generated frame for the Mth frame may be created for the Mth frame for M being other than Y. The iterative generating element 1020 may be repeated for M=Y−1 in an embodiment Y is greater than one, thereby creating generated frames for the at least two Mth generated frames. The iterative generating element 1020 may be repeated for M=Y−1, Y−2, . . . , 1 in an embodiment Y is greater than two.

It is to be appreciated that the above discussed repeating of the element 1020 for different values of N and M may be performed in any order, such as in series, parallel, or in any combination thereof.

Figures 11A, 11B:
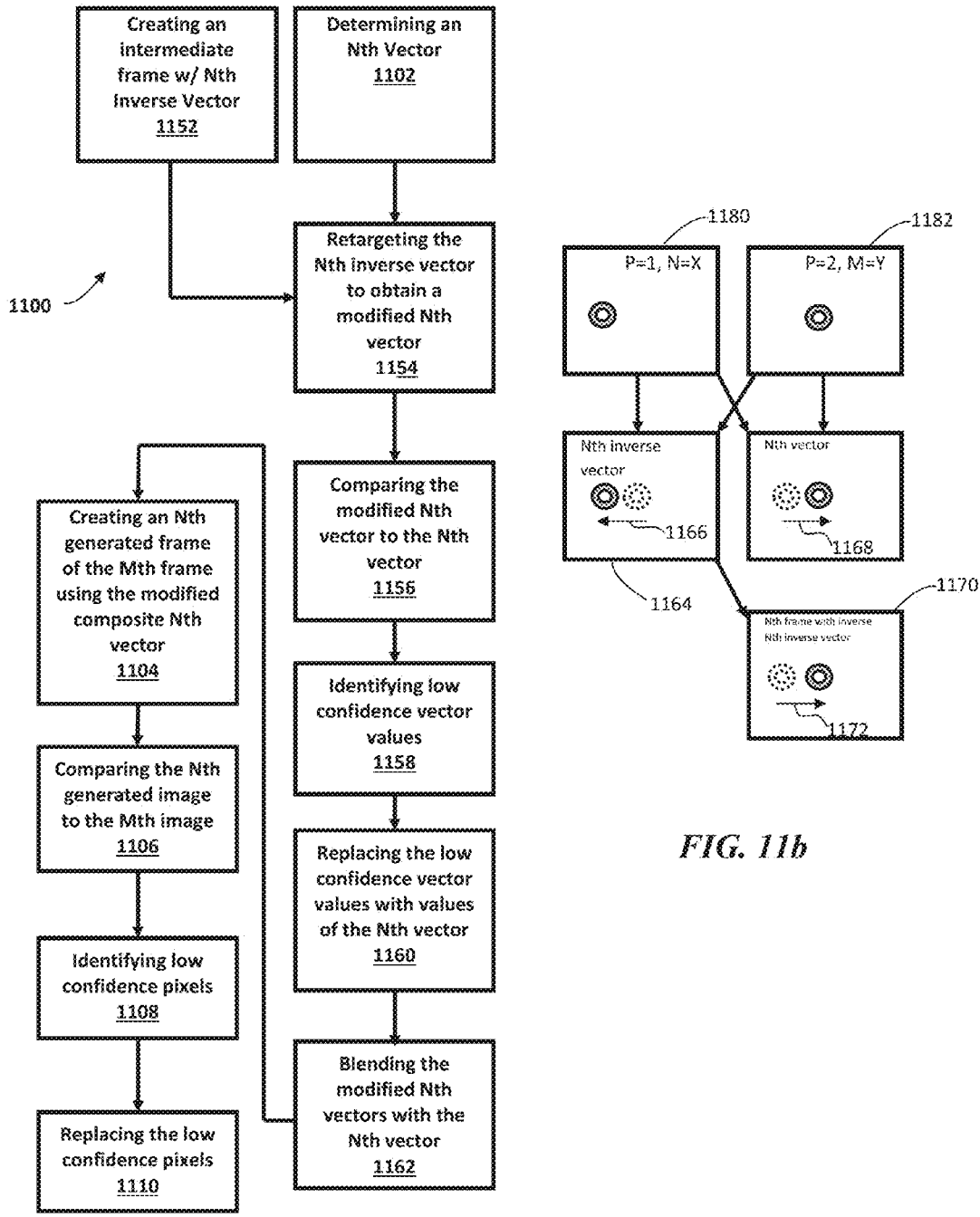
FIG. 11a is a flow diagram illustrating an exemplary bodiment of a process for constructing an image, in accordance with the present disclosure.
FIG. 11b is a schematic diagram demonstrating the operation of the process in FIG. 11a, in accordance with the present disclosure.

FIG. 11a is a flow chart diagram showing an exemplary embodiment of a process 1100 that may be implemented by the image processing module 304 to generate at least one image frame based on image data for a plurality of image frames. The process 1100 may include a determining element 1102, creating element 1104, comparing element 1106, identifying element 1108, and replacing element 1110 similar to the determining element 402, creating element 404, comparing element 406, identifying element 408, and replacing element 410 of the process 400, respectively. The process 1100 may be adapted to include additional process elements operable to modify the Nth vector for the Mth frame of the plurality of frames for N=X and M=Y and allow for improved accuracy of the Nth vector correlating the Mth frame to an Nth comparison frame.

FIG. 11b is a schematic diagram illustrating an exemplary modification of the Nth vector for the Mth frame. In the embodiment shown in FIG. 11b, frame 1180 may comprise image data for a first perspective, and frame 1182 may comprise image data for a second perspective. The second perspective frame 1182 is designated as the Mth frame for M=Y and the first perspective frame 1180 is designated as the Nth comparison frame for N=X. It is to be appreciated while perspective frames are illustrated in the example in FIG. 11b to demonstrate the operation of process 1100, the process 1100 may be applied to temporal frames or a combination of temporal and perspective frames in accordance with the principles disclosed herein. It is to be further appreciated that while only two frames are provided in FIG. 11b for illustrative purpose, in an embodiment, additional temporal and/or perspective frames may be processed by process 1100 in accordance with the principles disclosed herein.

Referring now to FIGS. 11a and 11b, in an embodiment, the Nth vector 1168 correlating the Mth frame 1182 to the Nth comparison frame 1180 may be determined in the determining element 1102 of the process 1100. The process 1100 may further include a creating element 1152 for creating an intermediate frame 1164 of the Nth comparison frame 1180. The intermediate frame may include an Nth inverse vector 1166 correlating the Nth comparison frame 1180 to the Mth frame 1182. The process 1100 may also include a retargeting element 1154 for retargeting the Nth inverse vector 1166. The retargeting of the Nth inverse vector creates an Nth intermediate frame 1170 of the Mth frame 1182 having a modified Nth vector 1172, which is an inverse vector of the Nth inverse vector 1166. Like the Nth vector 1168, the modified Nth vector 1172 also correlates the Mth frame 1182 to the Nth comparison frame 1180.

In an embodiment, the process 1100 may include a comparing element 1156 following the retargeting element 1154 for comparing the values of the Nth vector 1168 to values of the modified Nth vector 1168. Similar to the process 400, a rejection analysis may be performed on the values of the modified Nth vector 1168 just as a rejection analysis may be performed on the pixels of the Nth generated frame 508 identify and replace pixels that has a low confidence in accuracy. The values of the Nth vector 1168 may be compared to the values of the modified Nth vector 1172 in a fashion similar to the comparison of the pixels of the Nth generated frame 508 of FIG. 5c to the pixels of the Mth frame 500 of FIG. 5a.

In an embodiment, the process 1100 may include an identifying element 1158 for identifying low-confidence values of the modified Nth vector 1172. Similar to the identifying element 408 of process 400, in the identifying element 1158, a relative difference between the low-confidence values of the modified Nth vector 1172 and corresponding values of the Nth vector may be greater than a threshold, and the low-confidence values of the modified Nth vector 1172 may be rejected.

In an embodiment, the process 1100 may include a replacing element 1160 for replacing the low-confidence values of the modified Nth vector 1172 with values determined based upon the values of the Nth vector 1168. In some embodiments, a low-confidence value of the modified Nth vector 1172 may be replaced by an average of the corresponding values and the neighboring values in the Nth vector 1168. It is to be appreciated that the averaging used herein may be any type of averaging known, including linear averaging and weighted averaged for various factors, such as proximity to the location of the low-confidence values.

In an embodiment, the process 1100 may include a blending element 1162 for blending the modified Nth vector 1172 with the Nth vector 1168. The modified composite Nth vector may now be used in the creating element 1104 to create an Nth generated frame of the Mth frame more accurately because using the modified composite Nth vector realizes the benefits of vector analysis and rejection analysis not only in the creation of the Nth generated frame but also in the creation of the vector used to create the Nth generated frame. The synergistic benefits allowed by the adaptation of the process 1100 to include the creating element 1152, the retargeting element 1154, the comparing element 1156, the identifying element 1158, the replacing element 1160, and the blending element 1162 may be realized in other processes of the present disclosure by a similar adaption to include these element. For example, any of the processes 400, 600, 700, 800, 900, and 1000 may be modified to include the creating element 1152, the retargeting element 1154, the comparing element 1156, the identifying element 1158, the replacing element 1160, and the blending element 1162 in the processes' respective vector and rejection analyses.

It is to be appreciated that most of the process 1100 may be implemented at the image generation module 304, including the determining element 1102, the creating element 1104, the comparing element 1106, the identifying element 1108, the replacing element 1110, the creating element 1152, the retargeting element 1154, the comparing element 1156, the identifying element 1158, the replacing element 1160. The blending element 1162 may be implemented at the image blending module 306.

In an embodiment, X may be greater than one, and the process 1100 may be repeated for M=Y and N=X−1 to generate a plurality of Nth generated frames for the Mth frame. In an embodiment, X may be greater than two, and the process 1100 may be repeated to generate an Nth generated frame of the Mth frame for N=X−1, X−2, . . . , 1.

Figure 12:
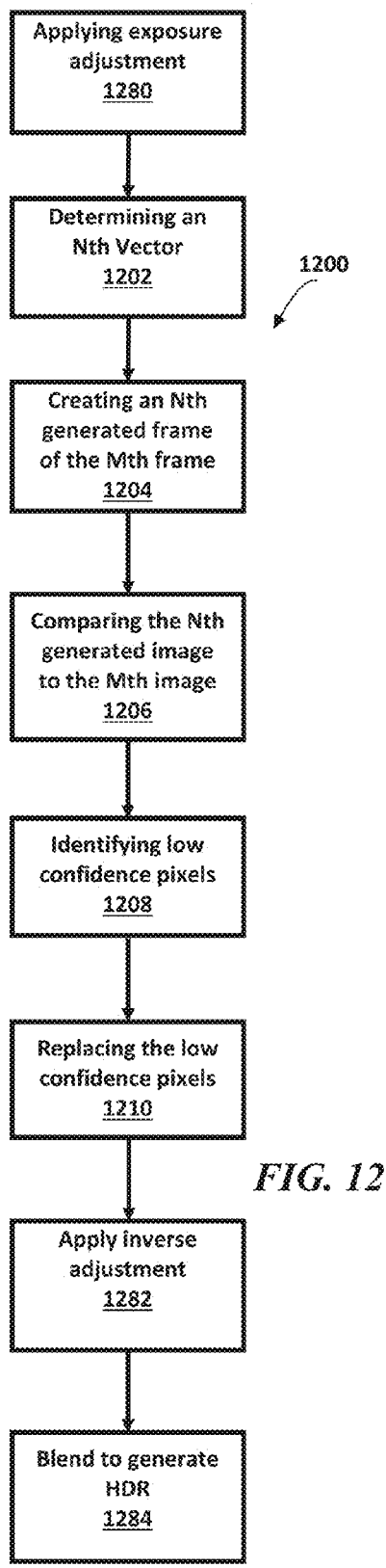
FIG. 12 is a flow diagram illustrating an exemplary bodiment of a process for constructing an image, in accordance with the present disclosure.

FIG. 12 is a flow chart diagram showing an exemplary embodiment of a process 1200 that may be implemented by the image processing system 300 to generate at least one image frame based on image data for a plurality of image frames. In an embodiment, the process 1200 may include a determining element 1202 that may be similar to the determining element 402 of process 400 discussed above. In the determining element 1202, for M being Y and N being X, an Nth vector may be determined for an Mth frame of the plurality of image frames using any embodiments of the vector analyses described herein. X and Y are each a number greater than zero. The Mth frame of the plurality of image frames may be a sequential, perspective, or sequential-perspective. The Nth vector may be a motion vector, a perspective vector, or a motion-perspective vector for correlating the Mth frame to an Nth comparison frame of the plurality of image frames that is not the Mth frame. The process 1200 may further include a creating element 1204, comparing element 1206, identifying element 1208, and replacing element 1210 similar to the creating element 404, comparing element 406, identifying element 408, and replacing element 410 of the process 400, respectively. The determining element 1202, creating element 1204, comparing element 1206, identifying element 1208, and replacing element 1210 are operate to generate an Nth generated frame for the Mth frame in accordance with the vector and rejection analyses of the present disclosure. The process 1200 may be adapted to include additional process elements for implementation with a plurality of frames having different exposures.

In an embodiment, the Mth frame and the Nth comparison frame may have different exposures, and the process 1200 may include an adjusting element 1280 preceding the determining element 1202 for adjusting a first exposure of the Nth comparison frame to a second exposure that relatively matches an exposure of an Mth frame of the plurality of frames. The substantially matched exposures of the Mth frame and the Nth comparison frame allow for a meaningful determination of the Nth vector. After the adjusting element 1280, the Nth generated frame may be generated using the vector and rejection analyses of the determining element 1202, creating element 1204, comparing element 1206, identifying element 1208, and replacing element 1210. The Nth generated frame may have an exposure that substantially matches the exposure of the Mth frame and the second exposure of the Nth comparison frame.

Figure 13A:
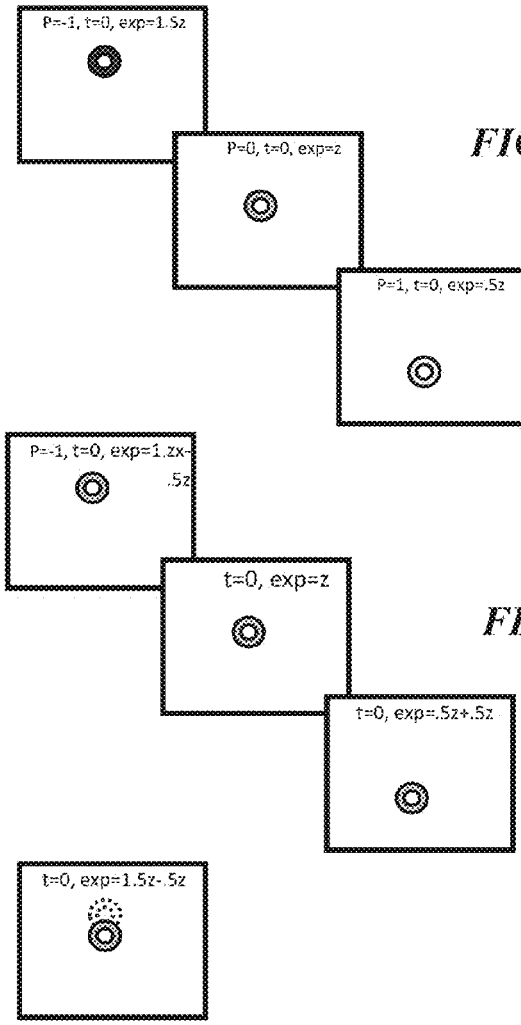
FIG. 13a-c is a schematic diagram demonstrating an exemplary operation of the process in FIG. 12, in accordance with the present disclosure.
Figure 13B:
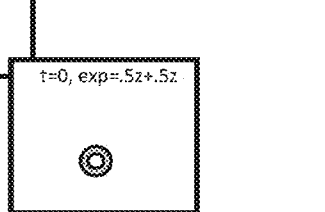
Figure 13C:
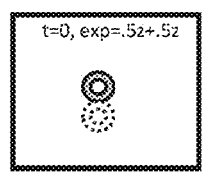

An exemplary illustration of the process 1200 is provided with reference to FIGS. 13a-13c.

FIG. 13a is a schematic diagram illustrating frames 1302, 1304, and 1306 having different exposures. The frame 1302 may be a first perspective frame having a perspective, P=−1, and an exposure that is about 1.5 z. The frame 1304 may be a second perspective frame having a perspective, P=0, and an exposure that is about z. The frame 1306 may be a third perspective frame having a perspective, P=0, and an exposure that is about 0.5 z. While only three perspective frames 1302, 1304, and 1306 are shown in the exemplary embodiment in FIG. 13a, it is to be appreciated that process 1200 may operate with any number and any combination of temporal and/or perspective frames in accordance with the principles disclosed herein. In an embodiment, the frame 1304 may be designated as the Mth frame for M=Y, and the other two frames may be designed as the Nth comparison frames for N=X, X−1. It is to be appreciated that process 1200 may be repeated for another frame designated as the Mth frame for M=Y−1 and 1 with the remaining two frames designed as the Nth comparison frames for N=X, X−1.

FIG. 13b is a schematic diagram illustrating frames 1302, 1304, and 1306 having substantially matched exposures. In the illustrated embodiment, a −0.5 z adjustment may be applied to the frame 1302 to adjust the exposure of the frame 1302 to around 1.5 z−0.5 z. A +0.5 z adjustment may be applied to the frame 1306 to adjust of the exposure of the frame 1306 to around 0.5 z+0.5 z. As such, the frames 1302, 1304, and 1306 may have substantially matched exposures with a value at around z.

FIG. 13c is a schematic diagram illustrating first and second generated frames 1308 and 1310. The frames 1308 and 1310 may be generated using vector and rejection analyses of the exposure adjusted frames 1302, 1304, and 1306 in accordance to determining element 1202, creating element 1204, comparing element 1206, identifying element 1208, and replacing element 1210. Since frames 1308 and 1310 are generated from the exposure adjusted frames 1302, 1304, and 1306 of FIG. 13b, the frames 1308 and 1310 also may have an exposure that substantially match the exposure of the exposure adjusted frames 1302, 1304, and 1306 of FIG. 13b. As such, the frame 1308 may have an exposure at around 1.5 z−0.5 z, and the frame 1310 may have an exposure at around 0.5 z+0.5 z.

Turning back to FIG. 12, after the replacing element 1210, the process 1200 may further include an applying element 1282 for applying an inverse adjustment to the exposure of the Nth generated frame such that an adjusted exposure of the Nth generated frame substantially matches the first exposure of the Nth comparison frame.

The process 1200 may further include a creating element 1284 for creating a composite frame for the Mth frame by blending the Nth generated frame and the Mth frame. In an embodiment, the blending of the Nth generated frame and the Mth frame may be performed while substantially retaining the pixel information of both the Nth generated frame and the Mth frame. As such, the composite frame may have a wider dynamic range than a dynamic range of either the Nth generated frame or the Mth frame.

The synergistic benefits allowed by the adaptation of the process 1200 to include the adjusting element 1280, the applying element 1282, and the creating element 1284 may be realized in other processes of the present disclosure by a similar adaption to include these element. For example, any of the processes 400, 600, 700, 800, 900, 1000, 1100 may be modified to include the adjusting element 1280, the applying element 1282, and the creating element 1284 to generate composite frames having a widen dynamic range.

It is to be appreciated that most of the process 1200 may be implemented at the image generation module 304, including the determining element 1202, creating element 1204, comparing element 1206, identifying element 1208, replacing element 1210, the adjusting element 1280, and the applying element 1282. The creating element 1284, which may be adapted into the creating elements 612, 712, 812, 912, 1012, and 1112 of the processes, 600, 700, 800, 900, 1000, and 1100, respectively, may be implemented at the image blending module 306.

Another exemplary illustration of the process 1200 is provided with reference to FIGS. 14a-14d.

Figure 14A:
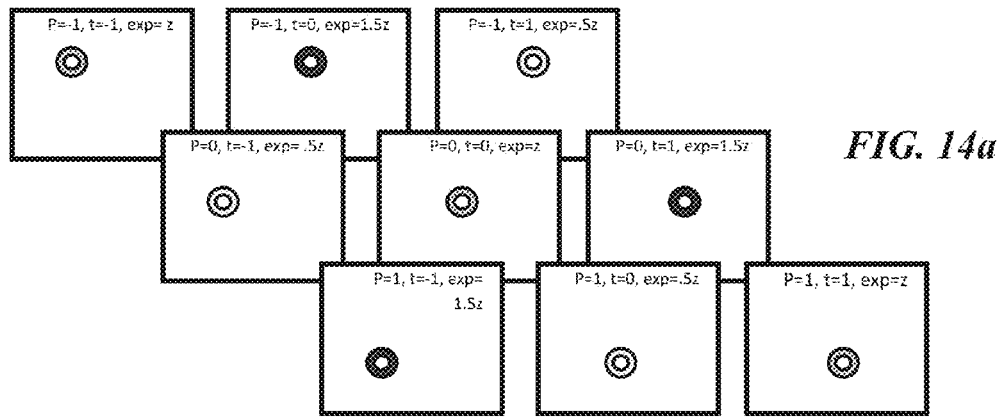
FIG. 14a-d is a schematic diagram demonstrating another exemplary operation of the process in FIG. 12, in accordance with the present disclosure.

FIG. 14a is a schematic diagram illustrating a 3×3 matrix of frames 1402, 1404, 1406, 1412, 1414, 1416, 1422, 1424, and 1426. The frames 1402, 1404, 1406, 1412, 1414, 1416, 1422, 1424, and 1426 may include temporal-perspective image data and have different exposures. In the first row, the frames 1402, 1404, and 1404 may be t=−1, 0, and 1 frames, respectively, from a first perspective, P=−1. The frames 1402, 1404, and 1404 may have exposures of around z, 1.5 z, and 0.5 z, respectively. In the second row, the frames 1412, 1414, and 1414 may be t=−1, 0, and 1 frames, respectively, from a second perspective, P=−0. The frames 1412, 1414, and 1414 may have exposures of around 0.5 z, z, and 1.5 z, respectively. In the third row, the frames 1422, 1424, and 1424 may be t=−1, 0, and 1 frames, respectively, from a third perspective, P=−0. The frames 1422, 1424, and 1424 may have exposures of around 1.5 z, 0.5 z, and z, respectively. While a 3×3 matrix of frames is shown in the exemplary embodiment in FIG. 14a, it is to be appreciated that process 1200 may operate with any number and any combination of temporal and/or perspective frames in accordance with the principles disclosed herein. In an embodiment, the p=0, t=0 frame 1414 may be designated as the Mth frame for M=Y, and the remaining frames in the 3×3 matrix may be designed as the Nth comparison frames for N=X, X−1, . . . , 1.

Figure 14B:
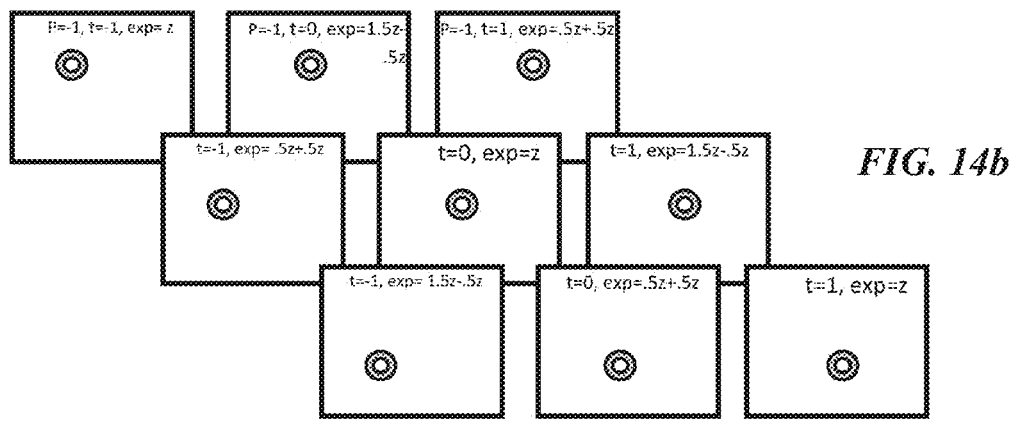

FIG. 14b is a schematic diagram illustrating the comparison frames 1402, 1404, 1406, 1412, 1416, 1422, 1424, and 1426 having exposures substantially matched to the exposure of the Mth frame 1414. In accordance with the adjusting element 1280 of process 1200, a −0.5 z adjustment may be applied to the frames 1404, 1416, and 1422 to adjust the exposure of the frames 1404, 1416, and 1422 to around 1.5 z−0.5 z. A +0.5 z adjustment may be applied to the frames 1406, 1412, and 1424 to adjust of the exposure of the frames 1406, 1412, and 1424 to around 0.5 z+0.5 z. No adjustment is applied to the frames 1402 and 1426 since these two frames already have an exposure around z that substantially matches the exposure of the Mth frame 1414. As such, the comparison frames 1402, 1404, 1406, 1412, 1416, 1422, 1424, and 1426 may have substantially matched exposures with a value at around z.

Figure 14C:
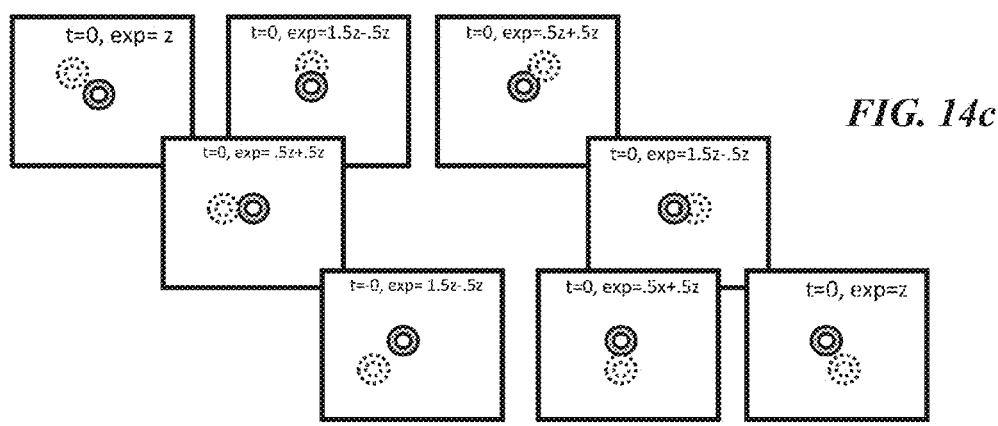

FIG. 14c is a schematic diagram illustrating generated frames 1402', 1404', 1406', 1412', 1416', 1422', 1424', and 1426' for the t=0 and p=0 Mth frame 1414. The frames 1402', 1404', 1406', 1412', 1416', 1422', 1424', and 1426' may be generated using vector and rejection analyses of the exposure-matched frames 1402, 1404, 1406, 1412, 1414, 1416, 1422, 1424, and 1426 in accordance to determining element 1202, creating element 1204, comparing element 1206, identifying element 1208, and replacing element 1210. Since frames 1308 and 1310 are generated from the exposure-matched frames 1402, 1404, 1406, 1412, 1414, 1416, 1422, 1424, and 1426 of FIG. 13b, the generated frames 1402', 1404', 1406', 1412', 1416', 1422', 1424', and 1426' also may have an exposure that substantially match the exposure of the exposure-matched frames 1402, 1404, 1406, 1412, 1414, 1416, 1422, 1424, and 1426 of FIG. 14b. As such, the generated frames 1406', 1412', and 1424' may have an exposure at around 1.5 z−0.5 z, and the generated frames 1406', 1412', and 1424' may have an exposure at around 0.5 z+0.5 z.

Figure 14D:
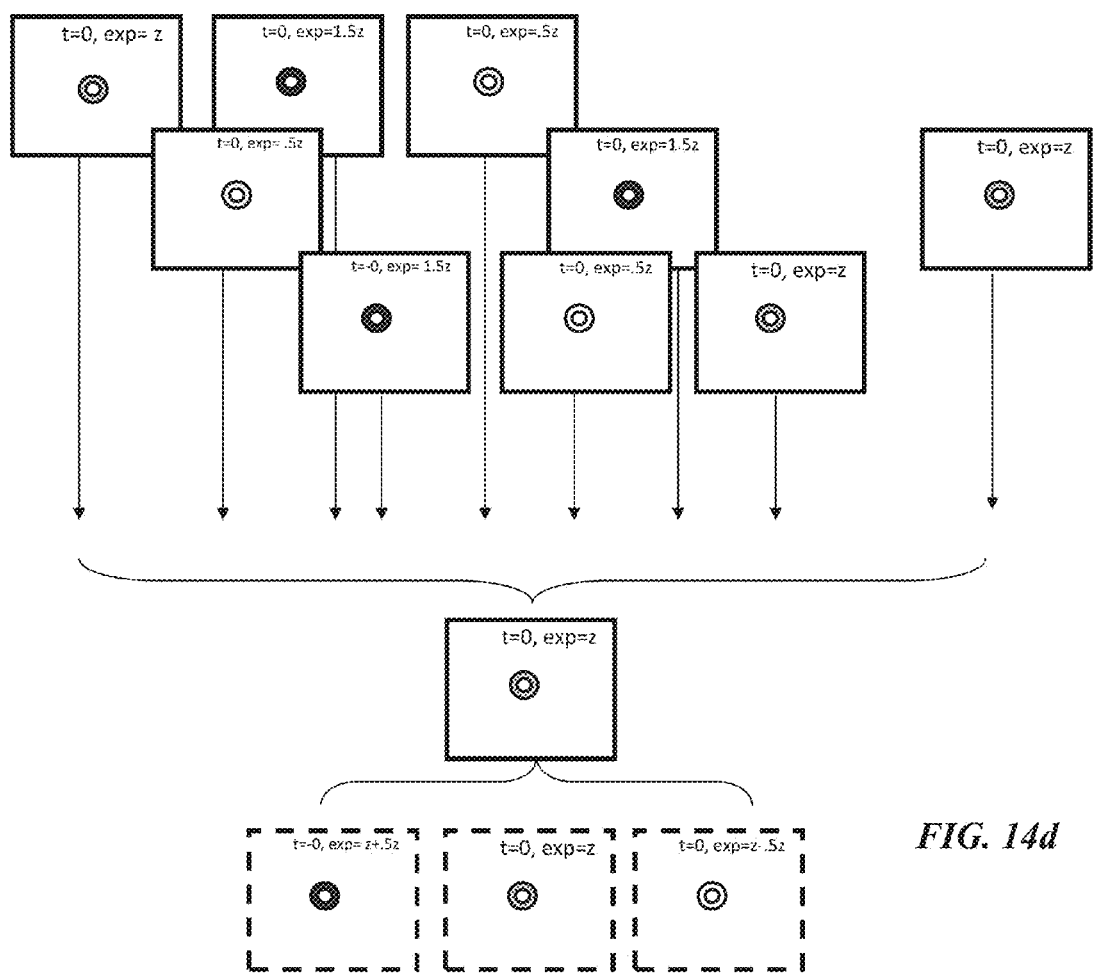

FIG. 14d is a schematic diagram illustrating the generated frames 1402', 1404', 1406', 1412', 1416', 1422', 1424', and 1426' having exposures that substantially match the original exposures of the comparison frames 1402, 1404, 1406, 1412, 1416, 1422, 1424, and 1426. In accordance with the applying element 1282 of 1200, an inverse adjustment is applied to the exposure of the generated frames 1404', 1406', 1412', 1416', 1422', 1424' such that the generated frames 1406', 1412', and 1424' may have an exposure at around 1.5 z, and the generated frames 1406', 1412', and 1424' may have an exposure at around 0.5 z. No inverse adjustment is applied to the generated frames 1402' and 1426' since the exposures of the corresponding comparison frames 1402 and 1426 was not adjusted in the adjustment element 1282 of the process 1200. As such the generated frames 1402', 1404', 1406', 1412', 1416', 1422', 1424', and 1426' along with the original Mth frame 1414 now include image data for the full dynamic range between 1.5 z to 0.5 z. In accordance with the creating element 1284 of the process 1200, the original Mth frame 1414 and the generated frames 1402', 1404', 1406', 1412', 1416', 1422', 1424', and 1426' may be blended to create a composite frame 1430 for the t=0 and p=0 Mth frame 1414. Due to the blending of generated frames and the original Mth frame, the composite frame 1430 may have a wider dynamic range than a dynamic range of any of the generated frames 1402', 1404', 1406', 1412', 1416', 1422', 1424', and 1426' or the Mth frame 1414 alone.

Figure 15:
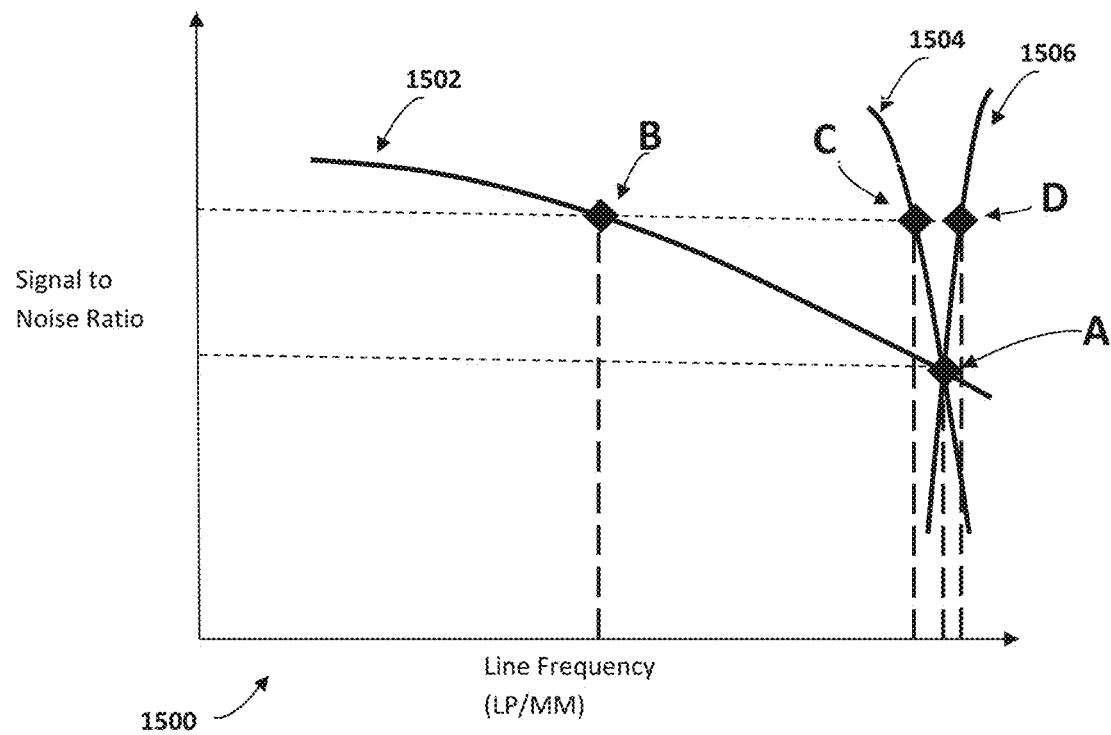
FIG. 15 is a schematic graph illustrating the charateristics of exemplary processes of the present disclosure, in accordance with the present disclosure.

FIG. 15 is a schematic graph 1500 comparing the embodiments of the present disclosure to conventional noise removal techniques, such as blurring. Graph 1500 plots signal-to-noise ratio (SNR) of an image frame on the vertical axis and line pair frequency (LPF) of the image frame on the horizontal axis. The SNR of an image frame is a measurement of the ratio between the amounts of image data for the real scene to the amount of image data for noise in a frame. The SNR may have a unit of decibel. The LPF of a frame is a measurement known in the art for characterizing the resolution of a frame and may have a unit of line pair per millimeter.

Given a pre-processed image frame, the LPF of such a frame may be determined in several different ways. In a first example, a lens chart for the lens used to capture the scene in the pre-processed image frame may include the LPF specification. In another example, the LPF of a frame may be determined from a calculation based on several measurements, including the focal length, the distance of a selected object in the image frame to the capture lens, the physical dimensions of the known object, and sensor size of the capture device. The focal length and senor size may be included in the published specification of the capture equipment. The focal length may also be determined from a computer analysis of the captured scenes containing the selected object. The dimensions of the selected object and the distance between the selected object and the capture lens may be determined using a computer analysis of the selected objects in multiple captured scenes.

In FIG. 15, curve 1502 illustrates a conventional noise removal process while curves 1504 and 1506 each may represent an exemplary embodiment disclosed herein, such as system 300 and processes 400, 600, 700, 800, 900, 1000, 1100, and 1200. A preprocessed image frame may have an SNR value and LPF value at point A on the curve 1502. Using a conventional noise removal process, such as blurring, to remove noise would increase the SNR value at the expense of the resolution of the image frame. As such, the SNR value and LPF value of a post-processed image frame would be at point B on the curve 1502, at which the LPF value has decreased by at least 10%.

In contrast to conventional noise removal processes, an embodiment of the present disclosure represented by the curve 1504 may be configured to increase the SNR value of a frame with no more than a 10% decrease in the LPF. In an embodiment, an exemplary process of the present disclosure may include to receiving, at an image generation module, a plurality of frames having a first LPF and a first SNR at point A on curve 1504. The exemplary process of the present disclosure may also include generating, with the image generation module, at least one frame based on image data in the plurality of frames, and the at least one generated frame may have a second LPF and a second SNR at point C on curve 1504. The second SNR at point C is greater the first SNR at point A, and the second LPF at point C is at least 90% of the first LPF at point A. In an embodiment, the second LPF at point C may preferably be at least 95% of the first LPF at point A.

Another process of the present disclosure is represented by the curve 1506, and it may be operable to increase the SNR value of a frame while also increasing the LPF. In an embodiment, an exemplary process of the present disclosure may include receiving, at an image generation module, a plurality of frames having a first LPF and a first SNR at point A on curve 1506. The exemplary process of the present disclosure may also include generating, with the image generation module, at least one frame based on image data in the plurality of frames, and the at least one generated frame may have a second LPF and a second SNR at point D on curve 1506. The second SNR at point D is greater the first at point A, and the second LPF at point D is greater than the first LPF at point A. In an embodiment, the second SNR may even be at or above a diffraction limit of a capture device.

Figure 16:
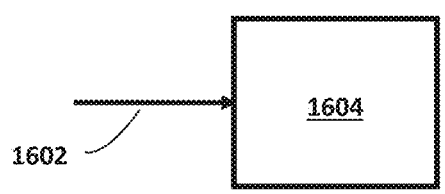
FIG. 16 is a schematic diagram showing an image processing system operable to generate an image having objective computational modifications, in accordance with the present disclosure.

FIG. 16 is a schematic diagram of an exemplary image processing system 1600. System 1600 may include an interface 1602 configured to receive an image having first and second relatively high variance regions (RHVRs) and first and second relatively low variance regions (RLVRs). System 1600 also may include a processor 1604 configured to generate an image with objective computational modifications of the signal-to-noise ratios in the first and second RHVRs and the first and second RLVRs.

FIG. 17 is a chart comparing the objective computational modifications that may be effected by the processor of FIG. 16. It is to be appreciated that the RHVR are regions with high variance and thus low signal-to-noise ratio. As show in FIG. 17, the RHVR may include regions rich in noise or detail signal (detail signal has low SNR at the edge). The RLVR are regions with low variance and thus high signal-to-noise ratio. As show in FIG. 17, the RLVR may include regions with low noise or los detail signals.

Referring to FIGS. 16 and 17, in an embodiment, the objective computational modifications may include any combinations of the following: 1) an increase of a signal-to-noise ratio ($\mu_{1st\ RHVR}/\sigma_{1st\ RHVR}$) of the first RHVR where $\mu_{1st\ RHVR}$ is the average pixel value of the first RHVR and $\sigma_{1st\ RHVR}$ is the standard deviation of the pixel values of the first RHVR; 2) a decrease of a signal-to-noise ratio ($\mu_{2nd\ RHVR}/\sigma_{2nd\ RHVR}$) of the second RHVR where $\mu_{2nd\ RHVR}$ is the average pixel value of the second RHVR and $\sigma_{1st\ RHVR}$ is the standard deviation of the pixel values of the second RHVR; 3) an increase of a signal-to-noise ratio ($\mu_{1stRLVR}/\sigma_{1st\ RLVR}$) of the first RLVR where $\mu_{1st\ RLVR}$ is the average pixel value of the first RLVR and $\sigma_{1st\ RLVR}$ is the standard deviation of the pixel values of the first RLVR; and 4) a decrease of a signal-to-noise ratio ($\mu_{2nd\ RLVR}/\sigma_{2nd\ RLVR}$) of the second RLVR where $\mu_{2nd\ RLVR}$ is the average pixel value of the second RLVR and $\sigma_{2nd\ RLVR}$ is the standard deviation of the pixel values of the second RLVR.

The effect of the increase of the signal-to-noise ratio ($\mu_{1st\ RHVR}/\sigma_{1st\ RHVR}$) of the first RHVR where it was noise rich is that noise may be reduced. The effect of the decrease of the signal-to-noise ratio ($\mu_{2nd\ RHVR}/\sigma_{2nd\ RHVR}$) of the second RHVR where it was detail rich is that detail signals can be further improved. The effect of the increase of the signal-to-noise ratio ($\mu_{1st\ RLVR}/\sigma_{1st\ RLVR}$) of the first RLVR where it has low noise is that noise can be further reduced. The effect of the decrease of the signal-to-noise ratio ($\mu_{2nd\ RLVR}/\sigma_{2nd\ RLVR}$) of the second RLVR where it has lost detail signal is that some detail signals may be recovered.

In an embodiment, the processor 1604 is configured to generate an image having objective computational modifications that include the increase of the signal-to-noise ratio of the first RHVR and the decreasing of the signal-to-noise ratio of the second RHVR. In an embodiment, the processor 1604 is configured to generate an image having objective computational modifications that include the increase of the signal-to-noise ratio of the first RHVR and the decrease of the signal-to-noise ratio of the second RLVR. In an embodiment, the processor 1604 is configured to generate an image having objective computational modifications that include the decrease of the signal-to-noise ratio of the second RHVR and the increase of the signal-to-noise ratio of the first RLVR. In an embodiment, the processor 1604 is configured to generate an image having objective computational modifications that include the increase of the signal-to-noise ratio of the first RLVR and the decrease of the signal-to-noise ratio of the second RLVR. In an embodiment, the processor 1604 is configured to generate an image having objective computational modifications that include the increase of the signal-to-noise ratio of the first RHVR, the decrease of the signal-to-noise ratio of the second RHVR, the increase of the signal-to-noise ratio of the first RLVR; and the decrease of the signal-to-noise ratio of the second RLVR.

To generate images having the objective computational modifications shown in FIG. 17, the processor 1604 may be configured to include some or all of the elements of the system shown in FIG. 3 as described above. The processor as configured may generate an image having the objective computational modifications based on a spatial-temporal analysis of pixels between a plurality of temporal frames and perspective views independent of identifying scene features. Without identifying scene features, such as the scene elements, foreground, background, etc., subjective evaluation is not required and computational efficiency can be achieved. The spatial-temporal analysis for the objective computational modifications may be any spatial-temporal analysis discuss in the present disclosure.

It should be noted that embodiments of the present disclosure may be used in a variety of optical systems and projection systems. The embodiment may include or work with a variety of projectors, projection systems, optical components, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments including the Internet, intranets, local area networks, wide area networks and so on.

Additionally, it should be understood that the embodiment is not limited in its application or creation to the details of the particular arrangements shown, because the embodiment is capable of other variations. Moreover, aspects of the embodiments may be set forth in different combinations and arrangements to define embodiments unique in their own right. Also, the terminology used herein is for the purpose of description and not of limitation.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A method for constructing an image, comprising:
   receiving a plurality of frames; and
   generating at least one generated frame, wherein generating comprises:
   a) determining, for M being Y and N being X, in which X and Y are each a number greater than zero, an Nth vector for an Mth frame of the plurality of frames, the Nth vector correlating the Mth frame to an Nth comparison frame of the plurality of frames that is not the Mth frame;
   b) creating an Nth generated frame of the Mth frame based on the Nth comparison frame different from the Mth frame and the Nth vector for the Mth frame;
   c) comparing pixels of the Nth generated frame of the Mth frame to pixels of the Mth frame;
   d) identifying low-confidence pixels of the Nth generated frame of the Mth frame, wherein a relative difference between the low-confidence pixels and corresponding pixels of the Mth frame is greater than a threshold; and
   e) replacing the low-confidence pixels of the Nth generated frame with pixels determined based upon the pixels of the Mth frame.

2. The method of claim 1, wherein X is greater than 1, and wherein generating further comprises:
   f) repeating a) through e) for N being X−1, thereby creating at least two generated frames for the Mth frame; and
   g) creating a composite frame for the Mth frame, wherein creating comprises blending the at least two generated frames for the Mth frame.

3. The method of claim 2, wherein Y is greater than 1, and generating further comprises:
   h) repeating a) through g) for M being Y−1, thereby creating at least two composite frames.

4. The method of claim 2, wherein Y is greater than 2, and generating further comprises:
   h) repeating a) through g) for M ranging from Y−1 to 1, thereby creating at least Y composite frames.

5. The method of claim 2, wherein creating a composite frame comprises blending the Mth frame and the at least two generated frames for the Mth frame.

6. The method of claim 2, wherein the method further comprises compressing the composite frame.

7. The method of claim 1, wherein X is greater than 2, and wherein generating further comprises:
   f) repeating a) through e) for N ranging from X−1 to 1 thereby creating at least X generated frames for the Mth frame; and
   g) creating a composite frame for the Mth frame, wherein creating comprises blending at least two of the at least X generated frames for the Mth frame.

8. The method of claim 7, wherein Y is greater than 1, and generating further comprises:
   h) repeating a) through g) for M being Y−1, thereby creating at least two composite frames.

9. The method of claim 7, wherein Y is greater than 2, and generating further comprises:
   h) repeating a) through g) for M ranging from Y−1 to 1, thereby creating at least Y composite frames.

10. The method of claim 7, wherein creating a composite frame comprises blending the Mth frame and the at least two of the at least X generated frames for the Mth frame.

11. The method of claim 1, wherein generating further comprises:
    f) creating a composite frame for the Mth frame, wherein creating comprises blending the Nth generated frame and the Mth frame.

12. The method of claim 11, wherein Y is greater than 1, and generating further comprises:

g) repeating a) through f) for M being Y−1, thereby creating at least two composite frames.

13. The method of claim 11, wherein Y is greater than 2, and generating further comprises:
g) repeating a) through f) for M ranging from Y−1 to 1, thereby creating at least Y composite frames.

14. The method of claim 1, wherein the relative difference is the value of $|PV_{NthGenerated} - PV_{Mth}|/PV_{Mth}$, in which $PV_{NthGenerated}$ is a low-confidence pixel value, and $PV_{Mth}$ is a corresponding pixel value in the Mth frame.

15. The method of claim 14, wherein the threshold is between 0 and 95%.

16. The method of claim 15, wherein the threshold is between 0 and 75%.

17. The method of claim 16, wherein the threshold is between 0 and 50%.

* * * * *